United States Patent [19]
Haghiri et al.

[11] Patent Number: 5,068,727
[45] Date of Patent: Nov. 26, 1991

[54] DEVICE FOR DECODING SIGNALS REPRESENTATIVE OF A SEQUENCE OF IMAGES AND HIGH DEFINITION TELEVISION IMAGE TRANSMISSION SYSTEM INCLUDING SUCH A DEVICE

[75] Inventors: Mohammed R. Haghiri, Sceaux; Philippe Guntzburger, Epinay-sous-Senart; Frédéric Fonsalas, Grigny; Marcel Le Queau, Ozoir-la-Ferriere, all of France

[73] Assignee: U. S. Philips Corporation, New York, N.Y.

[21] Appl. No.: 458,745
[22] PCT Filed: Apr. 17, 1989
[86] PCT No.: PCT/NL89/00023
§ 371 Date: Jan. 16, 1990
§ 102(e) Date: Jan. 16, 1990
[87] PCT Pub. No.: WO89/10039
PCT Pub. Date: Oct. 19, 1989

[30] Foreign Application Priority Data

Apr. 15, 1988 [FR] France ............... 88 05010
Jun. 28, 1988 [FR] France ............... 88 08652
Jul. 8, 1988 [FR] France ............... 88 09294

[51] Int. Cl.⁵ ................. H04N 7/12; H04N 7/00
[52] U.S. Cl. ...................... 358/138; 358/142; 358/105
[58] Field of Search ......... 358/141, 138, 142, 135, 358/105, 140, 11, 12

[56] References Cited
U.S. PATENT DOCUMENTS

| 4,442,454 | 4/1984 | Powell | 358/167 |
| 4,745,459 | 5/1988 | Ninomiya et al. | 358/12 |
| 4,785,348 | 11/1988 | Fonsalas | 358/133 |
| 4,845,561 | 7/1989 | Doyle et al. | 358/136 |
| 4,873,573 | 10/1989 | Thomas et al. | 358/133 |
| 4,963,965 | 10/1990 | Haghiri et al. | 358/140 |
| 4,985,767 | 1/1991 | Haghiri et al. | 358/133 |
| 5,027,206 | 6/1991 | Vreeswijk et al. | 358/141 |

OTHER PUBLICATIONS

Colloque TVHD '87, Ottawa, 4-8 Oct. 1987, vol. 1, P. Bernard et al.: "Analyse de structures de sous-é'chantillonnage spatio-temporel d'un signal TVHD en vue de sa transmission dans un canal MAC", pp. 6.2.2-6.2.28, voir p. 6.2.8, line 20-p. 6.2.13, line 9, figure 15.

Primary Examiner—James J. Groody
Assistant Examiner—Safet Metjahic
Attorney, Agent, or Firm—Michael E. Marion

[57] ABSTRACT

A high definition image transmission system comprising a stage for the transmission of encoded data representative of images and, after transmission of these data at a specific field frequency and by a first channel having a limited passband, a stage for receiving the transmitted data. The transmission stage comprises an image encoding device having three processing channels in parallel for the purpose of transmission, at three separate transmission rates, of one or another of these three channels depending on the output signal of a decision circuit. It further comprises a device for decoding the encoded data, comprising three processing branches located in parallel and each receiving the sequence of the encoded data and a circuit for routing the outputs of the said branches according to the output signal of the decision circuit transmitted to the decoding device by a second channel called the digital assistance channel. Each branch comprises in series, a dynamic interpolation circuit and a spatial filtering circuit and one of the branches also comprises in series, a circuit for reconstructing images from the transmitted encoded data and from data representative of the motion of the original images.

8 Claims, 18 Drawing Sheets

DEVICE FOR DECODING SIGNALS REPRESENTATIVE OF A SEQUENCE OF IMAGES AND HIGH DEFINITION TELEVISION IMAGE TRANSMISSION SYSTEM INCLUDING SUCH A DEVICE

DESCRIPTION

Background of the Invention

In known high definition television image transmission systems utilizing a MAC (multiple analog component) standard, transmission is provided by means of an analog channel which carries the data which have been compressed. This analog channel is associated with an auxiliary channel called the digital assistance channel enabling the transmission of additional data relating to the motion of the images transmitted by the analog channel.

One problem which arises is maintaining a satisfactory spatial definition despite the motion in the images to be transmitted and despite the data compression necessary for adapting the quantity of these data to the limited passband of the transmission channel.

The object of the invention is therefore to provide, for a high definition television image transmission system, a decoding device effectively resulting in the best possible spatial resolution no matter what the speed of displacement of the content of the transmitted images may be.

SUMMARY OF THE INVENTION

The invention relates to a device characterized in that it comprises three processing branches located in parallel and each receiving the sequence of the said encoded data transmitted by a first channel and a circuit for routing the outputs of the said branches according to the output signal of a decision circuit transmitted to the decoding device by means of a second channel called the digital assistance channel. The branches in particular comprise, in series, a dynamic interpolation circuit and a spatial filtering circuit, in that one branch also comprises, in series, a circuit for reconstructing images from, on the one hand, the transmitted encoded data and, on the other hand, from data representative of the motion of the original images which is substituted for these images and also transmitted by means of the second channel. The first and third branches also comprise, in series, multiplexers receiving on the one hand the interpolated output data of the corresponding dynamic interpolation circuits, on the other hand the output signal of the decision circuit, and also the output signal of the image reconstruction circuit of the second branch.

The invention also relates to a high definition television image transmission system including such a device.

The invention is in fact essentially applicable in the high definition television field. In a high definition television image transmission system according to the MAC standard, it enables a reduction in the passband of television signals for the purpose of transmitting them.

BRIEF DESCRIPTION OF THE DRAWINGS

The features and advantages of the invention will now appear in a more detailed way in the following description and in the appended drawings, given by way of non-limiting example and in which.

DETAILED DESCRIPTION OF PREFERRED EMBODIMENTS OF THE INVENTION

Figure 1A:
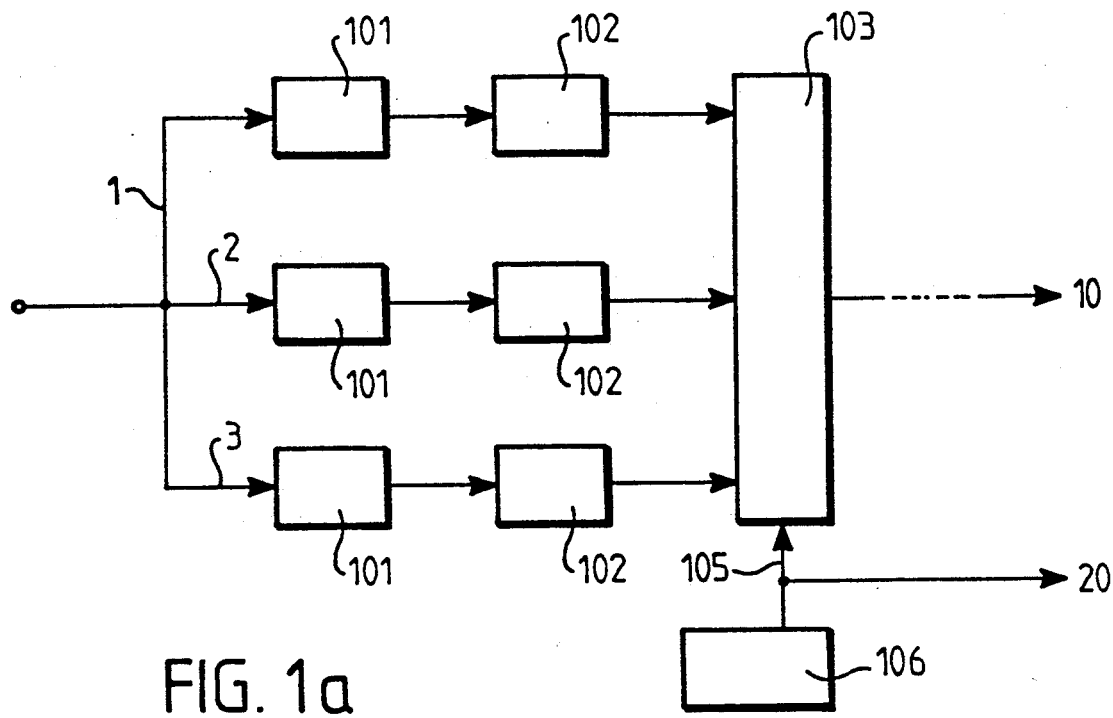
FIGS. 1a and 1b respectively show the encoding section on the transmission side and the decoding section on the reception side of a motion estimation and compensation device for a television image transmission system.
Figure 1B:
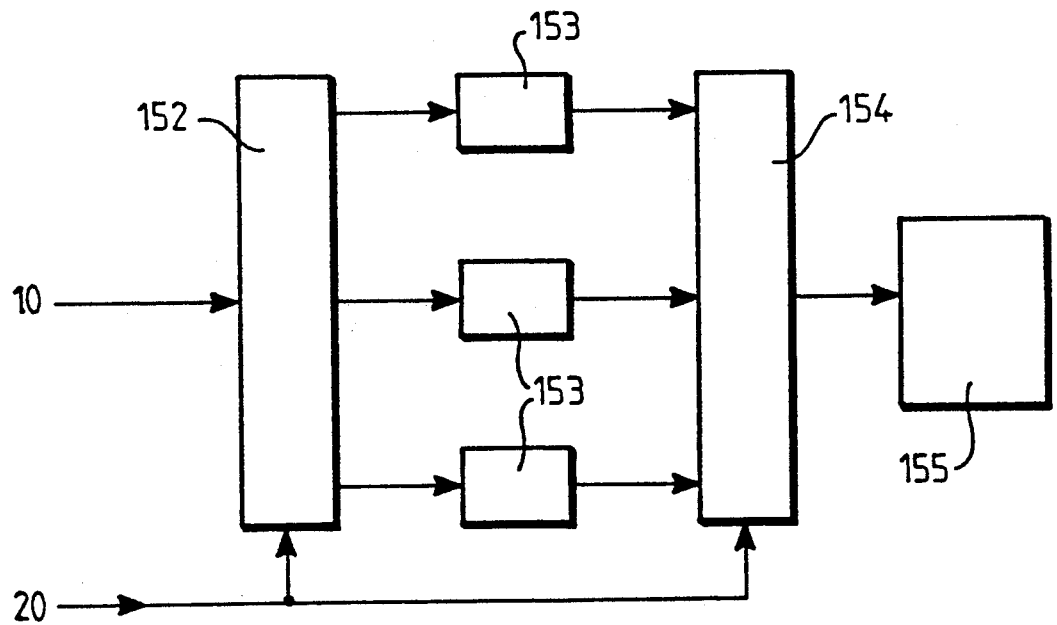

The device shown in FIG. 1 in the case of application to a high definition television image transmission system comprises a section for encoding on transmission (FIG. 1a) and a section for decoding on reception (FIG. 1b), which work in conjunction with each other to detect and estimate the motion inside the images to be transmitted and to adapt the processing of image data to the greater or lesser magnitude of that motion. The images are here acquired by a high resolution television camera (not shown) which analyzes the scene by means of an interlaced or sequential 1250 line scanning at the rate of 50 images per second. The camera of course supplies, after the matrixing of the R, G, B signals, three types of signals: the luminance signal Y and the two colour difference signals U and V (or chrominance signal). In the following examples, the description relates for example to the luminance signal but would apply equally well to the chrominance signal. It will therefore be simply stated that the output signal of the camera is sampled, and that the resultant samples are applied to the input of the encoding section at a rate of 54 Megahertz in the case of an interlaced scanning and of 108 Megahertz in the case of a sequential scanning. As the transmission channel, in the case of the MAC standard, tolerates only a rate of 13.5 Megahertz, a sub-sampling must be carried out prior to the said transmission.

It will be stated that the images could, at the limit, be processed point by point but it is simpler to divide them into N blocks of m×n points. Instead of carrying out a point by point scanning, a scanning of blocks will then be performed, these blocks corresponding with N points representative of the said blocks.

The motion estimation mentioned above is provided in the following way. The encoding section shown in FIG. 1a is formed of several branches in parallel, three for example, here called 1, 2 and 3. These branches receive the samples formed as mentioned above and each comprise a pre-filtering circuit 101 and a sub-sampling circuit 102. Even though the sampling structures are different from one branch to another, the sub-sampling rates are identical and equal to 4 in this case for a series of interlaced images and 8 for a series of sequential images. The filter characteristics are chosen such that foldover due to the sub-sampling is avoided. The outputs of the three sub-sampling circuits are applied to a routing circuit 103 which, depending on the instruction received on a fourth input connection 105, selects one or other of the said outputs for the purpose of its subsequent transmission via the analog channel 10 of the transmission system.

The instruction present on the connection 105 of the routing circuit 103, normally identical for all the points of a block, is determined by a decision circuit 106, according to a criterion generally associated either with a quantity measured from the input image, or with the energy difference between the processed images, coming from the circuits 101 for example, and the original image. In the first case (a priori decision) the quantity measured can for example be the motion or the velocity of objects present in the image, and the decision is made directly according to the value assumed by this quantity. In the second case (a posteriori decision) the energy difference enables the determination of the branch which leads to the best image reconstruction by means of the transmitted samples, and therefore enables the appropriate routing to be performed. The data supplied by the decision circuit 106 is sent to a channel 20 called the digital assistance channel.

Similarly, on reception, the corresponding decoding section, shown in FIG. 1b, firstly comprises a demultiplexing circuit 152 which, from the signal transmitted via the analog channel 10, supplies images with appropriate and regular structures to three post-filtering circuits in parallel 153. Finally, a multiplexing circuit 154 receives the outputs of these post-filtering circuits and enables, from the multiplexed signal, the generation of an image which can be displayed on a high definition screen 155. The signal transmitted via the digital assistance channel 20 is supplied in parallel to the circuits 152 and 154.

The sub-ssampling structures, different from one branch to another as has been seen, can be purely spatial or can furthermore enable the elimination of a certain number of images in the temporal direction. A proportionally higher number of samples is therefore available for representing the spatial contents of the images but, on the other hand, in the case of motion, the temporal contents representing this motion are degraded.

Two types of degradation can be particularly noted in the reconstructed image. On the one hand uniform motions are altered, the objects moving in jerks, and on the other hand the definition suddenly reduces as soon as a fixed object becomes a moving object because of the pre-filtering and the post-filtering. Both of these faults are visually very annoying, and the presence of motion estimation and compensation will considerably remedy this by eliminating the jerks while retaining the definition over a wider velocity range.

The motion compensation principle according to the invention is as follows. In the sequence of images concerned, every other image is first eliminated (i.e. the spatial information available at a given instant t). Thus, if the rate or temporal frequency is for example 1/T where T corresponds to the time interval separating two successive images, the time interval after temporal sub-sampling will be 2T. Calling the successive ranks of the original sequence of images $2k-1$, $2k$, $2k+1$, etc. . . signifies that the images associated for example with the instants $t+(2k-1)T$, $t+(2k+1)T$, etc. . . , or in this case images of odd rank, are eliminated.

At the same time as this image elimination, motion data are determined using a motion estimation method providing the allocation to each block of images to be eliminated, in this case the odd images, of a displacement vector D such that the reconstruction error of the block is minimal. These motion data are then used on reception for reconstructing the images eliminated before transmission, each block being reconstructed from the mean of the data from two consecutive images in the direction of the motion associated with the block. In this way there is limitation of the faults due to the inaccuracy of the estimator, when the latter was, up to the present, using the conventional solution of a reconstruction of an odd field (or respectively an even field only on the basis of the preceding field of opposite parity, a solution which had the disadvantage of distorting the outlines of solid objects.

The principle thus defined is applicable for example in a high definition television image transmission system and first of all in the encoding section of the transmission stage of this system.

In the following text, the spatial-temporal sub-sampling performed enables the obtaining of a sampling rate of 4 (2 spatial, 2 temporal) for a series of interlaced images, and of 8 (4 spatial, 4 temporal) for a series of sequential images. The motion estimator which will be used is based on the so-called block matching method, with a search range equal to: horizontal displacement ±3, vertical displacement ±3). However, this choice is not limiting and an estimator of another type could be used. It will also be stated here that the branches 1, 2, 3 correspond to different displacement velocities in the images, the basic interval between images being, in the described example, 20 and 40 milliseconds for the branches 1 and 2 respectively and the basic interval between elementary transmitted points having the same spatial position in the image being 80 milliseconds for the branch 3. It is obviously in the branches 2 and 3 that there is an advantage in retaining the best definition, as the motion is slower than in the case of the branch 1. The application to the branch 2 will be described firstly, the extension to the branch 3 being described later.

Figure 2:
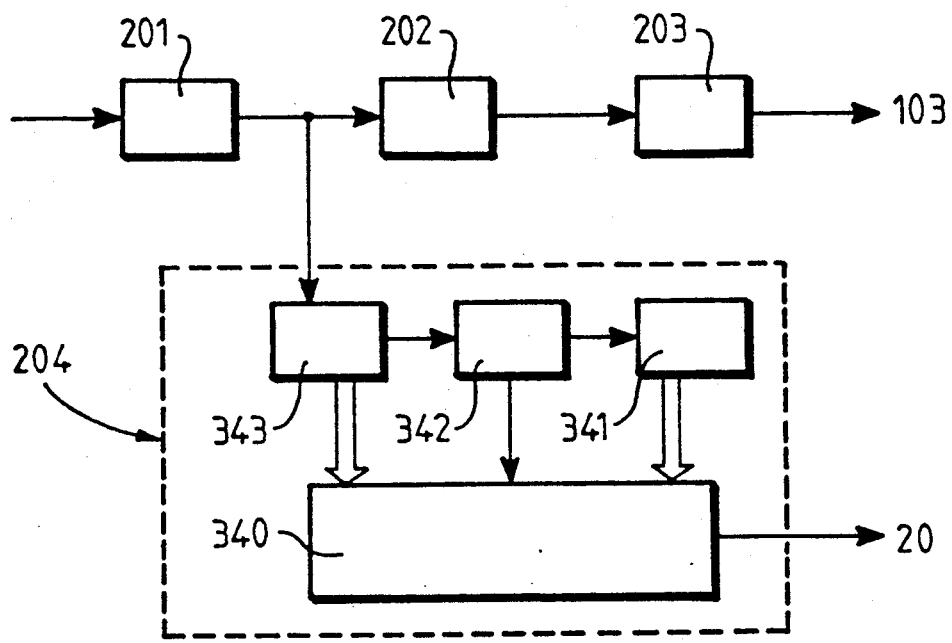
FIGS. 2 and 4 respectively show the encoding section on the transmission side and the decoding section on the reception side of an embodiment of another motion estimation and compensation device for a high definition television image transmission system.

According to the example shown in FIG. 2, the device shown firstly comprises, on the transmission side, for the branch referenced 2, a spatial pre-filtering circuit 201 receiving the input image, which is either a 50 Hertz interlaced image 2:1, 1250 lines, 54 M-samples ($=54.10^6$) per second, or a 50 Hertz sequential image, 1:1, 1250 lines, 108 M-samples per second. This circuit 201 enables the obtaining of a sequential image, limited in spatial bandwidth in order to avoid the foldover due to the temporal sub-sampling. The circuit 201 is followed, in series, by a temporal sampling circuit 202 which divides the temporal image rate by two (a rate of 25 images per second is therefore obtained), then by a spatial sub-sampling circuit 203 which enables a reduction in the number of samples in each image plane (for example by means of a quincuncial line sub-sampling which eliminates one point in two). At the output of the circuit 201 there is also provided, in parallel with the series connection of the circuits 202 and 203, a motion estimation stage 204 which will now be described in detail.

The motion estimation performed by the stage 204 has the objective of determining, for each image block of rank $2k+1$ which is eliminated, a displacement vector D such that it is possible to obtain an approximation of the said eliminated image from the half-sum of the non-eliminated images which enclose it, in the present case from the half-sum of the images $2k$ and $2k+2$. This approximation is here expressed by the equation (1), given in the appendix like the other mathematical expressions which appear in the rest of the description. In this equation, X denotes the current block of the image $2k+1$, D denotes the motion vector when the motion estimation has been applied to the images $2k$ and $2k+2$, and I denotes the approximation of the intensity of the point X of the current block of the image $2k+1$.

This objective can also be formulated by saying that it is desired to associate with each block X of the image $2k+1$ a vector $D_x$ such that the expression (3) is a minimum (this expression, in which DFD is derived from the corresponding English expression "Displaced Frame Difference", is the approximation error associated with the current block and equivalent, for this block as indicated by the expression (2), to the sum of squares of the approximation errors DFD over all the points of the block). This known principle for examining the correlation between blocks (described in particular in the article by J. R. Jain and A. K. Jain, "Displacement measurement and its application in interframe image coding", published in the IEEE Transactions on Communications, vol. COM-29, No. 12, December 1981, pages 1799 to 1808) is used, in the motion estimation stage 204 described here, in two distinct but extremely similar steps.

Figure 3A:
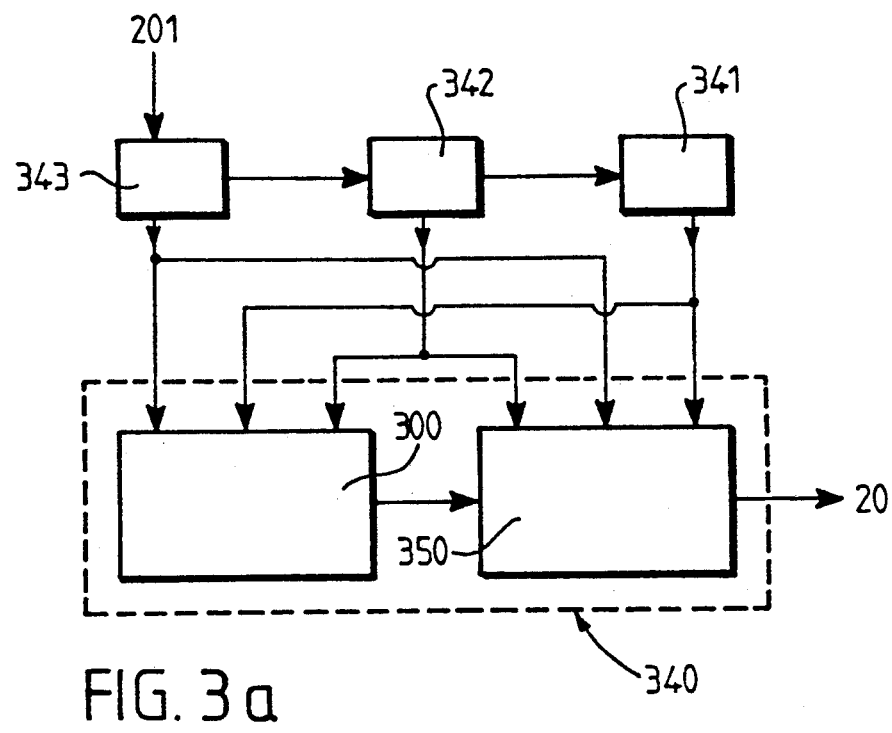
FIG. 3a is a more detailed representation of a motion estimation stage in the device of FIG. 2, FIGS. 3b and 3d explain the content of the estimation circuits of the stage shown in FIG. 3a, and FIG. 3c shows an illustrative embodiment of the stages forming these estimation circuits.
Figure 3B:
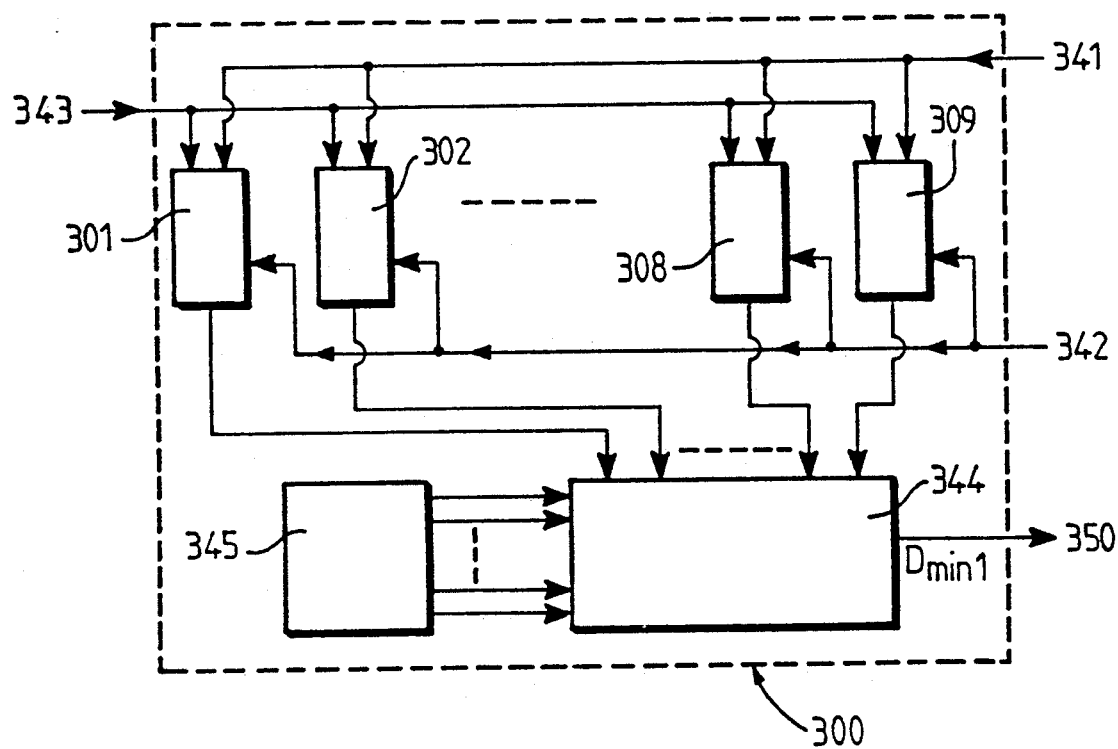
Figure 3C:
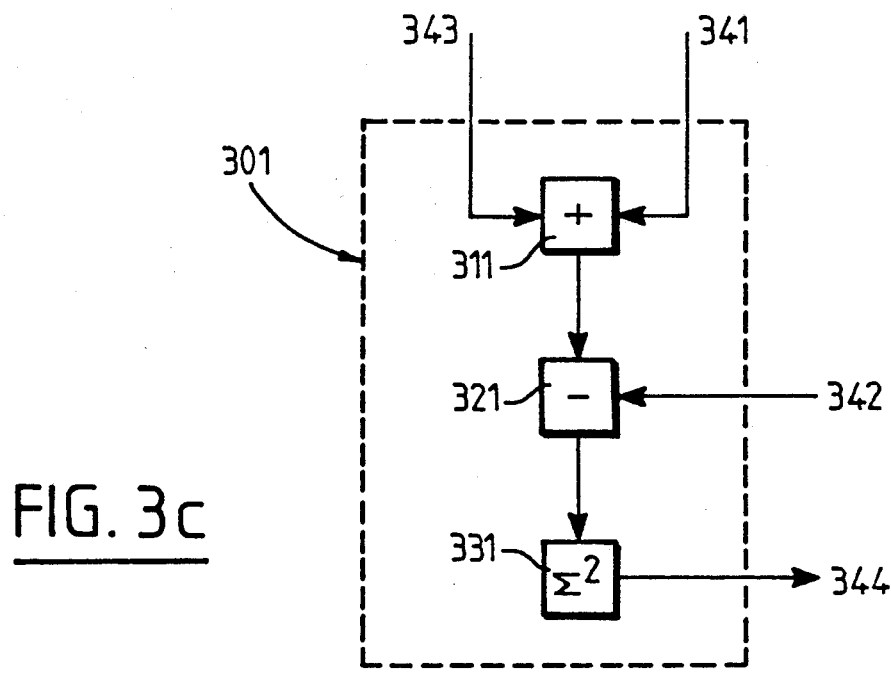

The motion estimation stage 204, shown by way of non-limiting example in FIG. 3a, comprises, for the execution of these two steps, a group 340 of two practically identical estimation circuits 300 and 350 (shown in FIG. 3a), as well as three image memories in series 341, 342, 343. The estimation circuit 300, for example, comprises, as shown in FIG. 3b which shows in greater detail nine identical stages 301 to 309 thereof determining nine distortions (or estimation error such as defined by the expression (3) or the expression (2)) relating to the nine following displacements $(D_x, D_y) = (2, 2), (2, 0), (2, -2), (0, 2), (0, 0), (0, -2), (-2, 2), (-2, 0), (-2, -2)$. These nine displacements are stored in a memory 345. Each of the stages 301 to 309 itself comprises identical elements, and these elements, considered for example for the first of the nine stages, comprise, as shown in FIG. 3c which shows this first stage, an adder 311, which is intended to produce the half-sum of the images of rank $2k$ and $2k+2$, then a substracter 321 and, in series with these two elements, a squaring and summing circuit 331. The adder 331 receives the output of the image memories 341 and 343, and the half-sum of the images $2k$ and $2k+2$ thus obtained is supplied to the input, for example the positive input, of the sub-tractor 321 which receives on its input of opposite sign the output of the image memory 342 storing the image of rank $2k+1$. The output of the subtracter 321 is applied to the squaring and summing circuit 331 whose output forms the output of the stage 301.

Figure 3D:
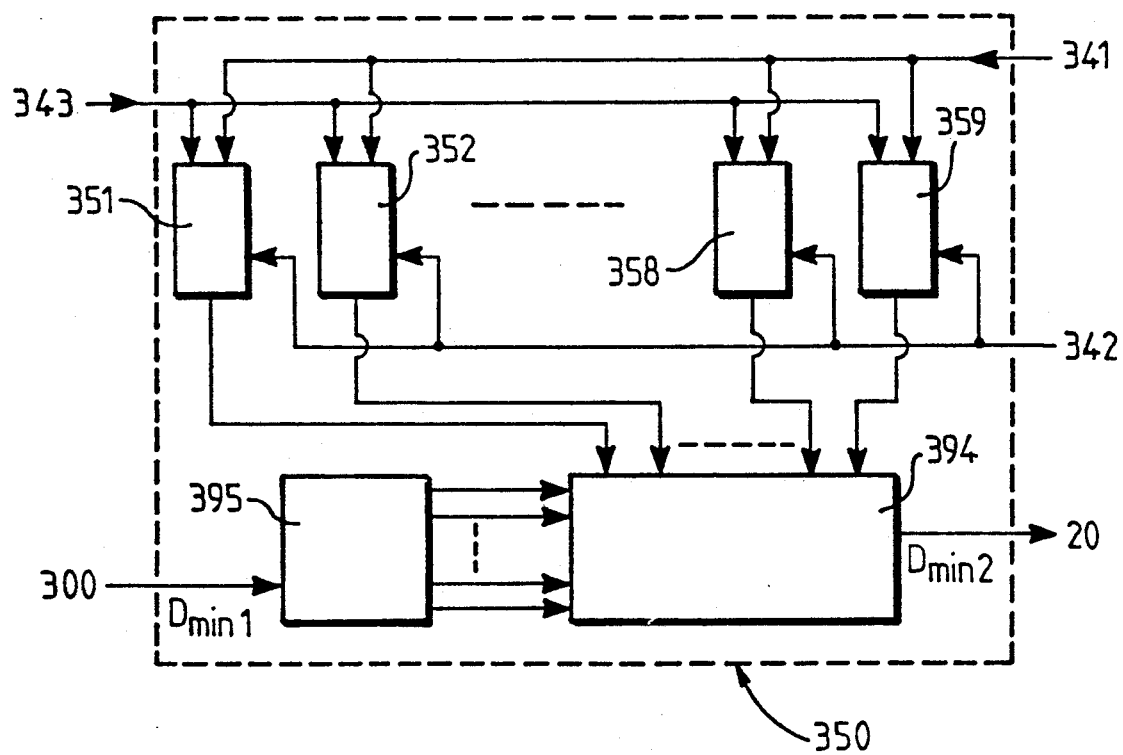

The nine respective outputs of the nine stages 301 to 309 are then supplied to a distortion comparison circuit 344 which compares the nine distortion values thus coming from the nine stages and determines that which is the lowest. The displacement among the nine displacements which results in this minimum block distortion is called $D_{min1}$ and, after extraction from the memory 345, is sent to the second estimation circuit 350. The circuit 350, shown in FIG. 3d, repeats precisely the same operations as the estimation circuit 300, but on one other displacement values which are as follows: $(D_x, D_y) = D_{min1}+(1, 1), D_{min1}+(1, 0), D_{min1}+(1, -1), D_{min1}+(0, 1), D_{min1}+(0, 0), D_{min1}+(0, 1), D_{min1}+(-1, 1), D_{min1}+(-1, 0), D_{min1}+(-1, 1)$, and which are stored this time in a memory 395 receiving $D_{min1}$.

The estimation circuit 350 comprises nine stages 351 to 359, themselves formed of identical elements which, considered for example as before for the first of the nine stages, comprise an adder, a substracter and a squaring and summing circuit, arranged in series. The inputs of the nine stages 351 to 359 are supplied to a distortion comparison circuit 394 which determines the smallest distortion and enables the selection of the corresponding displacement $D_{min2}$, i.e. the one which minimizes the distortion for the current block X of the image $2k+1$.

The displacement thus selected is then sent to the digital assistance channel 20, while the output of the spatial sub-sampling circuit 203 is sent to the routing circuit 103. On reception, a motion compensation device receives a sequence of images at a rate of 25 images per second, these images being spatially sub-sampled, and reconstructs a sequence of images at 50 images per second, 1250 lines, 1440 points per line, either in 2:1 interlaced format with $54 \cdot 10^6$ samples per second, or in sequential format with $108 \cdot 10^6$ samples per second.

Figure 4:
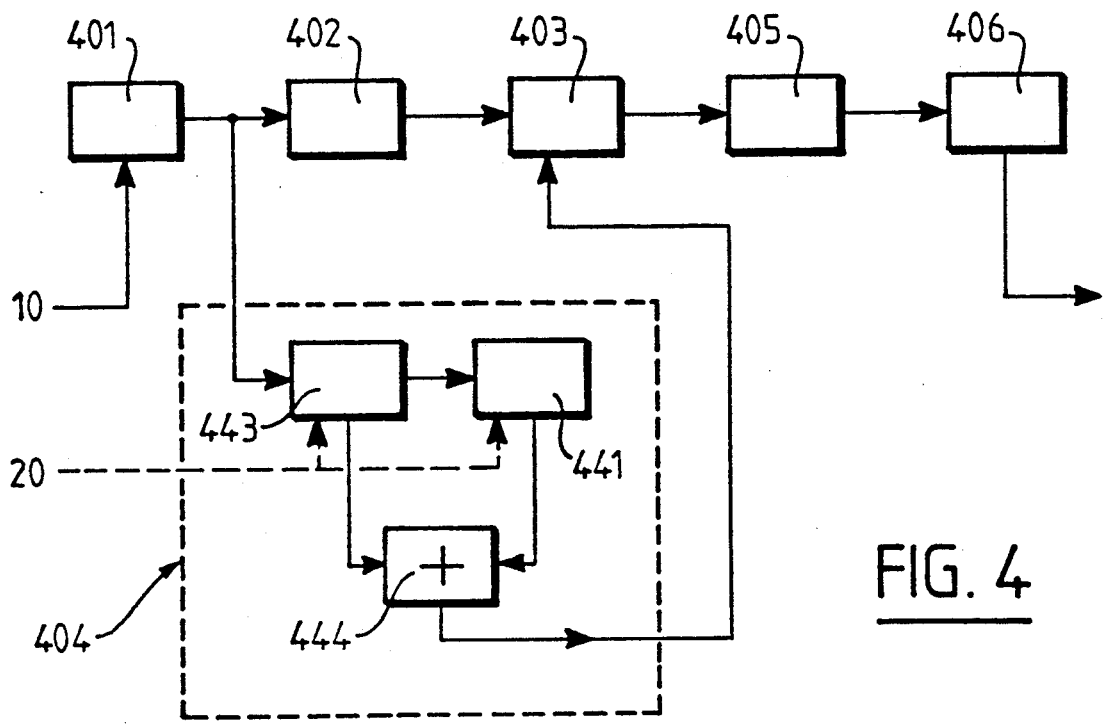

This device for motion compensation on reception firstly comprises, as shown in the illustrative embodiment of FIG. 4, a spatial post-filtering circuit 401 performing a spatial interpolation in order to obtain a sequence of 25 images per second, 1250 lines per image, 1440 points per line. This circuit 401 followed by a delay circuit 402 (the delay imparted is 20 milliseconds in this case), then by a switch 403 which enables, from two image sequences each having a period of 40 milliseconds but shifted by 20 milliseconds, the reconstruction of a sequence having a period of 20 milliseconds. At the output of the spatial post-filtering circuit 401 there is also provided, in parallel with the series connection of the circuits 402 and 403, a motion compensated temporal interpolation stage 404.

This stage 404 comprises on the one hand two image memories in series 441 and 443, which store the two successive images transmitted by the analog channel 10 and post-filtered, i.e. the two images of rank 2k and 2k+2 respectively, and on the other hand an adder 444 which is connected to the outputs of the said memories and which enables the production of the half-sum of the transmitted images, according to expression (4) where X represents the coordinates of the current point, $D_{min2}$ represents the displacement allocated to the point and delivered by the digital assistance channel 20, $I(X-D_{min2}, 2k)$ and $I(X+D_{min2}, 2k+2)$ represent the intensity at the points associated with X on the transmitted images of rank 2k and 2k+2 respectively (taking into account the estimated motion), and I represents the intensity of the point X of the eliminated image to be reconstructed. The output of the adder 444 constitutes the second input of the switch 403.

The switch 403 therefore receives on the one hand 1:1 images which are the images 2k, 2k+2, etc... transmitted every 40 milliseconds and, on the other hand, 1:1 images which are the images I estimates according to the displacement transmitted by the channel 20 and whose period is also 40 milliseconds and having a shift of 20 milliseconds with respect to the transmitted images. This switch 403 therefore delivers a sequence of images having a rate of 20 milliseconds between images. A format conversion circuit 405 transforms this series of sequential images into a series of high definition interlaced images ready to be displayed. In the case in which the series of high definition images is displayed in sequential format, the format conversion circuit 405 is omitted.

The device structures described above can be modified in order to obtain a higher temporal subsampling rate, for example equal to 4. These modified structures are shown in FIG. 5 for the transmission section, and in FIG. 6 for the reception section.

Figure 5:
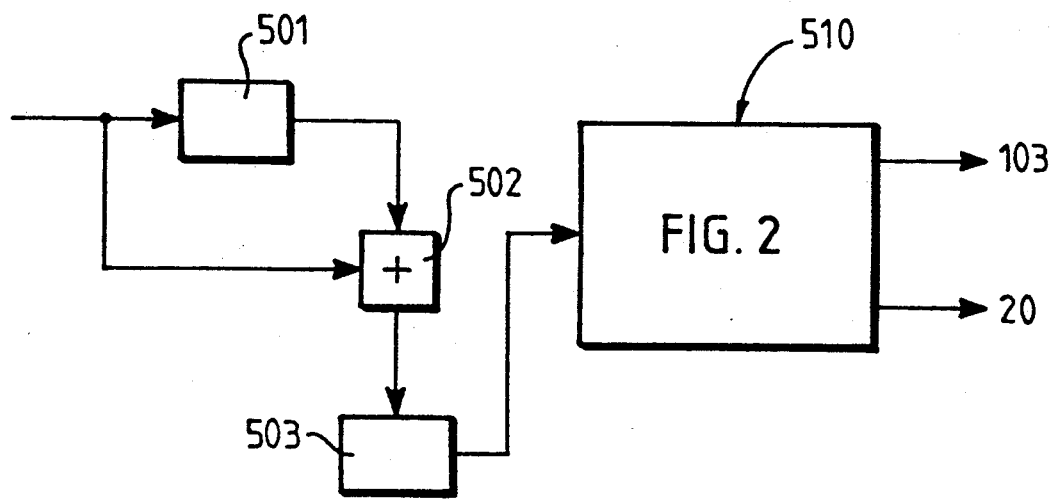
FIGS. 5 and 6 show variant embodiments incorporating the devices of FIGS. 2 and 4 respectively.

The motion estimation device on the transmission side therefore comprises, as shown in FIG. 5 in the case of a series of interlaced images, on the one hand the device of FIG. 2, denoted here by the reference 510, and on the other hand, connected to the input of this device 510, a temporal filtering and holding circuit, composed of a delay circuit 501, imparting a delay equal to T and an adder 502 and a temporal subsampling circuit 503. The temporal filtering and holding circuit (501, 502) receives the 2:1, 50 Hz, 1250 line images and supplies at its output a series of sequential images (1:1, 50 Hz, 1250 lines) the sampling of which enables the obtaining at the input of the motion estimation device 510 of a series of sequential 1250 L., 25 Hz, 1:1 images. This sequence of images is processed by the device 510 which finally delivers a series of sequential iamges having an 80 millisecond period. In the case of a series of sequential images, the functions of the circuits 501 and 502 are already completed, and these circuits are therefore omitted. The input images are therefore received directly by the circuit 503.

Figure 6:
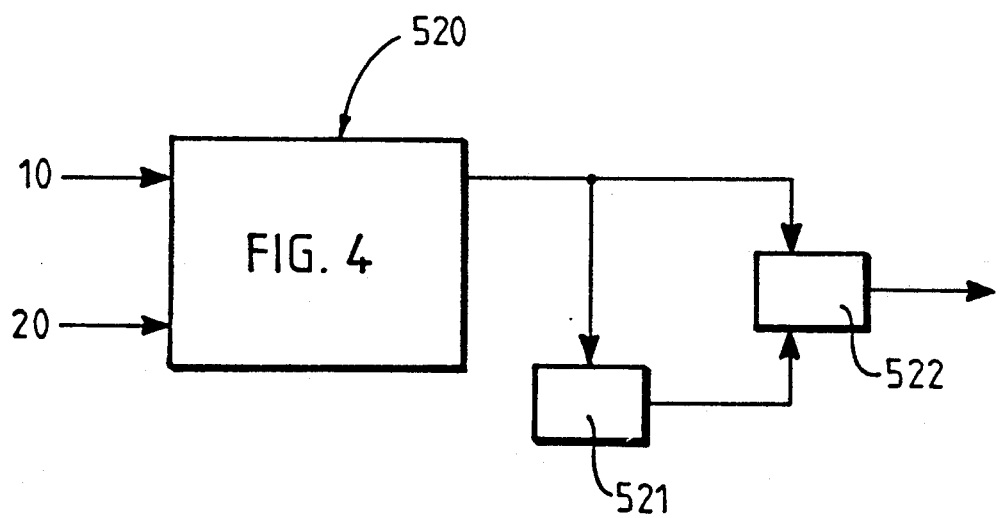

Similarly, on the reception side, the motion compensation device comprises, as shown in FIG. 6, on the one hand the device of FIG. 4 here denoted by the reference 520 and, on the other hand, at the output of this device 520, an interpolation circuit composed of a delay circuit 521 imparting a delay equal to T and of a switch 522. This interpolation circuit (521, 522), enables the transformation of the series of 1250 line, 25 Hz, 1440 points per line sequential images present at the output of the device 520 into a sequence of interlaced image having a temporal rate of 20 milliseconds, i.e. into a series of 1250 line, 50 Hz, 2:1, 54 M-samples per second images, which is supplied to the multiplexer whose output constitutes the sequence of high definition interlaced images ready to be displayed. This same device (521, 522) also enables the obtaining of sequential 1250 L., 50 Hz, 1:1, 108 M-samples/second images.

Figure 7:
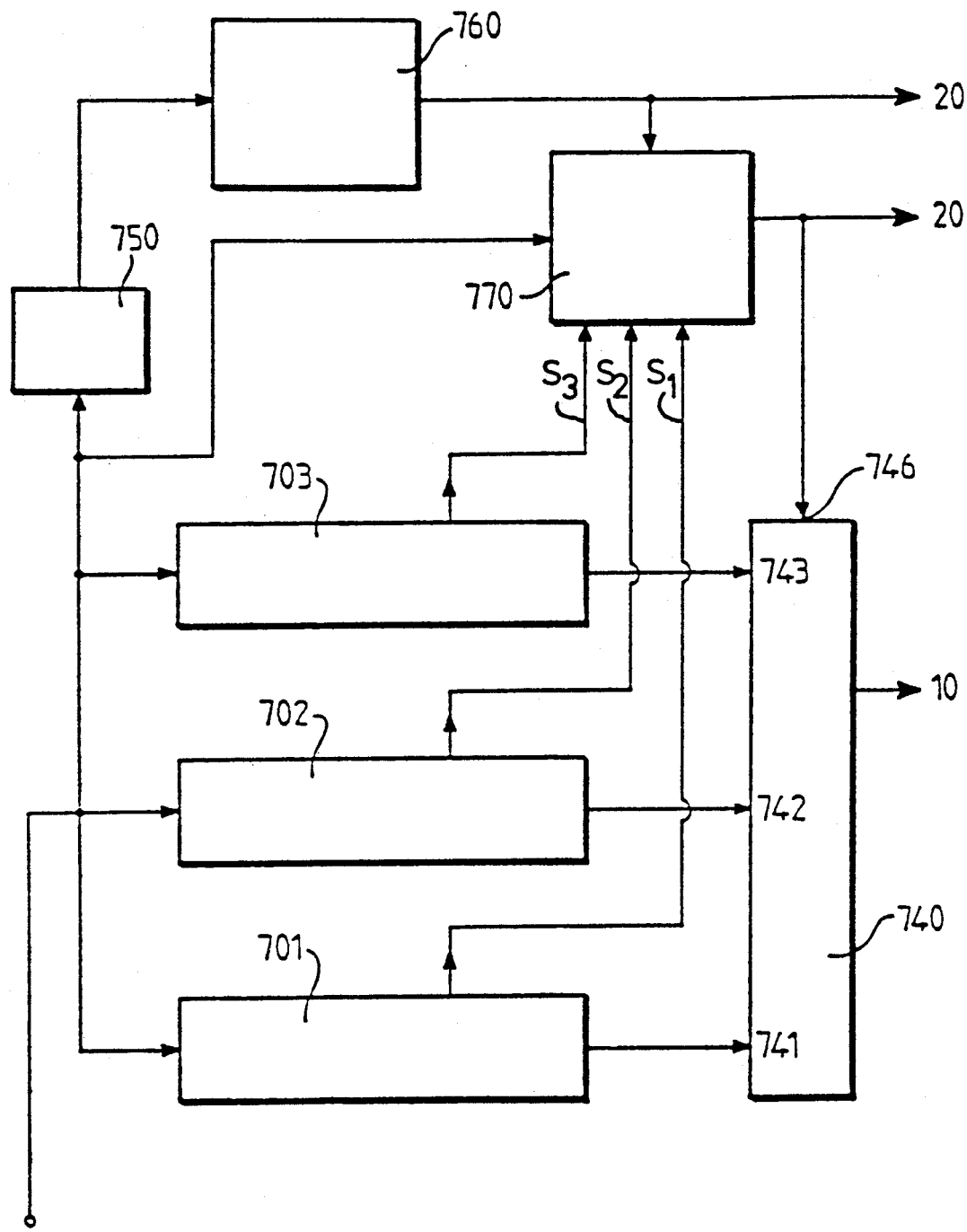
FIG. 7 shows an example of an embodiment, in a high definition television image transmission system, of a device for encoding data capable of being received by a decoding device according to the invention.
Figure 17:
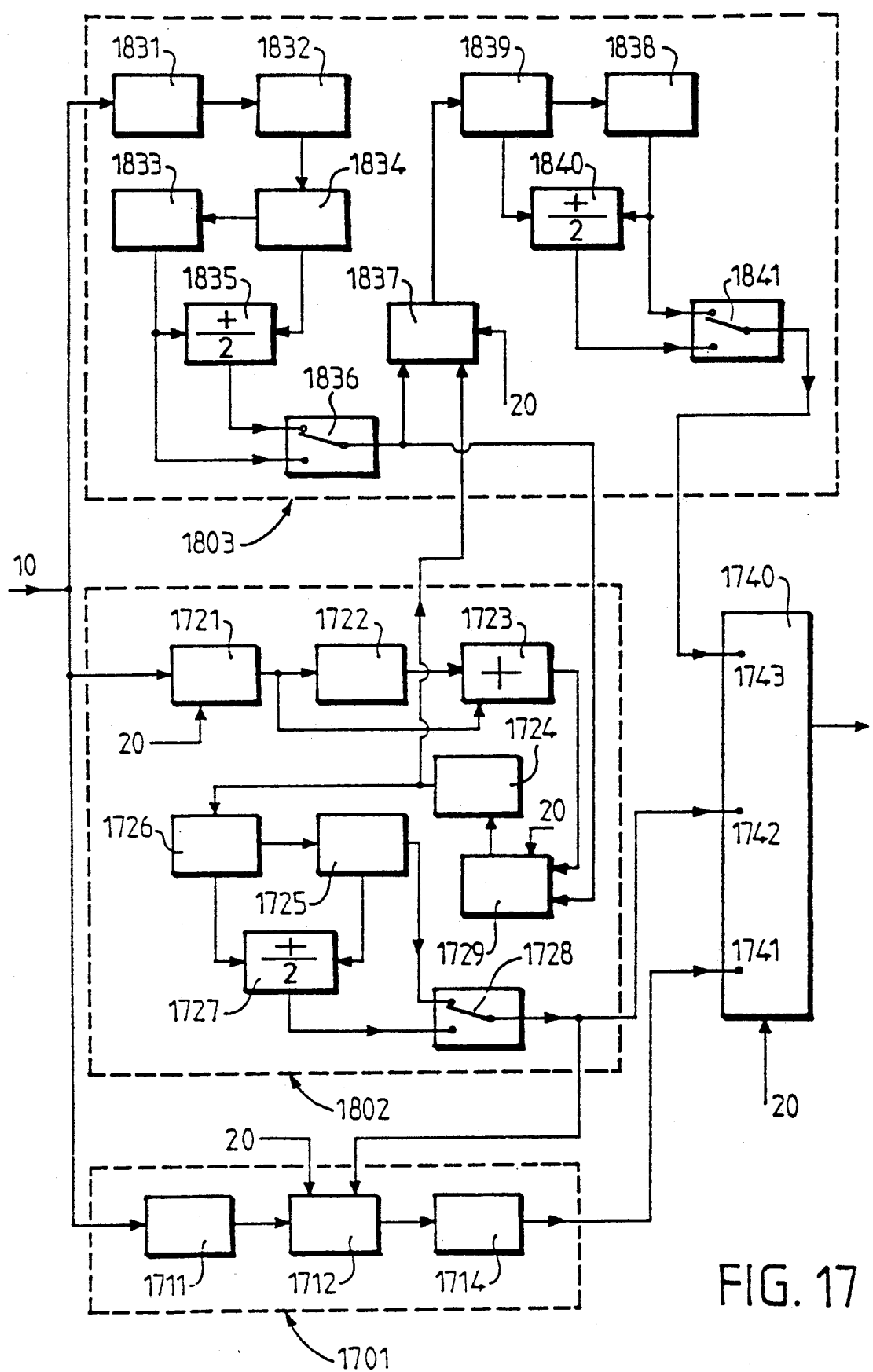
FIG. 17 shows the modified decoding device associated with the variant encoding device shown in FIG. 12.

Furthermore, it is also possible to apply the principle and the implementation described above in a transmission system constituted as follows. FIG. 7 shows a possible embodiment, in a high definition television image transmission system, of a device for the encoding of data capable of being received by a decoding device according to the invention, and FIG. 11 correspondingly shows an illustrative embodiment of such a decoding device. FIGS. 2 and 17 similarly will show a perfected variant of the encoding device and of the corresponding decoding device.

More precisely, the encoding device in FIG. 7 firstly comprises, in parallel, three branches 701, 702, 703 here called the 20 millisecond branch, the 40 millisecond branch and the 80 millisecond branch respectively. These three branches 701 to 703 described below each receive, on their common input E, the high resolution images which can have either the 1250 L., 50 Hz, 2:1, 1440 points/line format, and therefore organized as a series of interlaced images, or the 1250 L., 50 Hz, 1:1, 1440 points/line format, and therefore organized as a series of sequential images.

Figure 8A:
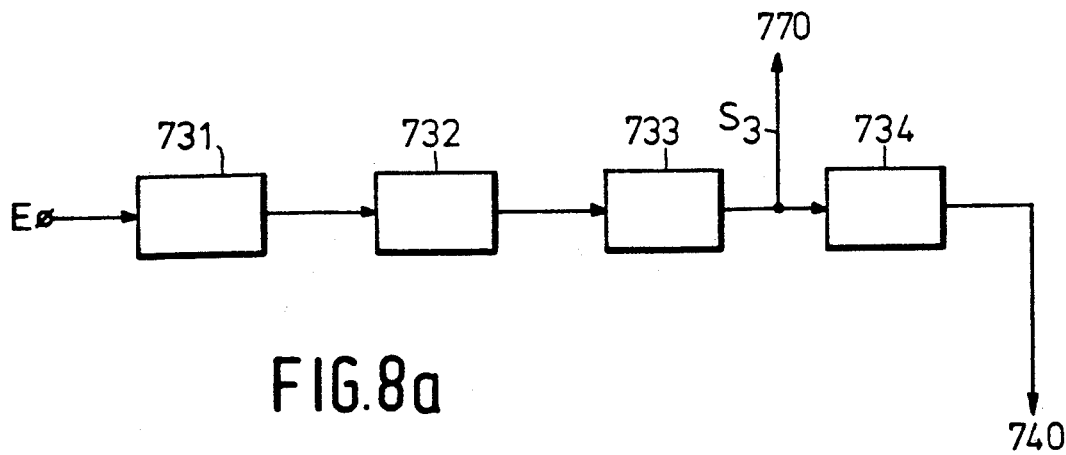
FIGS. 8a to 8c show the three processing branches in the device of FIG. 7.
Figure 8B:
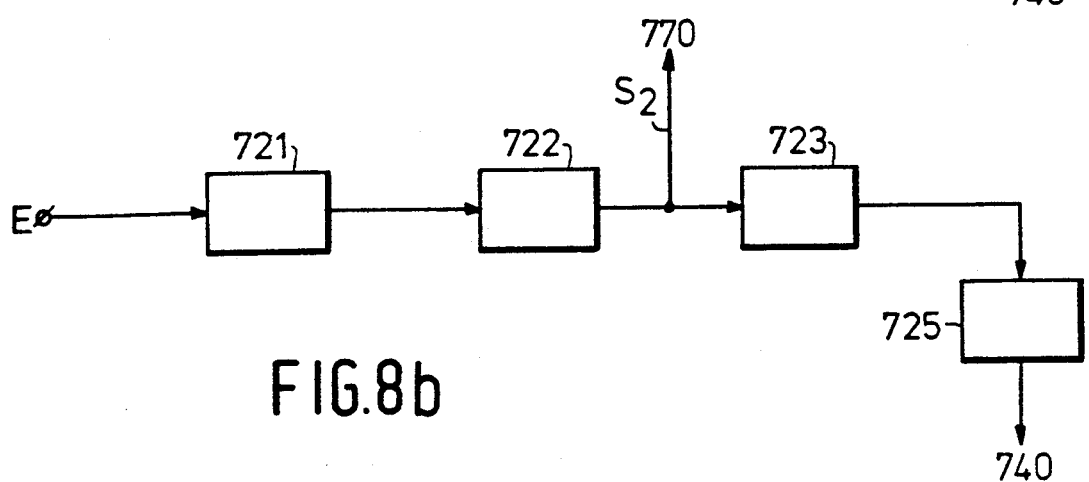

In the seocnd branch 702, called the 40 millisecond branch, shown in FIG. 8b, the processing described above in performed, executed in the case in FIG. 2 by the circuits 201 and 203 and, in the present case of FIG. 8b, by the circuits 721, 722, 723. More precisely, a temporal filter 721 sampling at the rate $\frac{1}{2}$ supplies 625 L., 25 Hz, 1:1, 1440 p./line images, when the input E is in the interlaced format, or 1250 L., 25 Hz, 1:1, 1440 points/-line images when the input E is in the sequential format. These images are then received by a spatial filter 722 supplying 1250 L., 25 Hz, 1:1, 1440 points/line images, then by a quincuncial line spatial sub-sampling circuit, 723 supplying 1250 L., 25 Hz, 2:1, 720 p./line images. The output images of the spatial subsampler 723, according to the image format shown in FIG. 9b, are supplied to a format modification circuit 725 (known as a "shuffle circuit" in English) which, in two frames and in 40 milliseconds (therefore every 20 milliseconds) sends them in groups of lines (1, 5, 9, 13, etc, ...., then 3, 7, 11, 15, etc ...) to an input of a routing circuit 740 whose function is described later. The images present at the input of the spatial sub-sampler 723 (connection $S_2$) are also sent to a decisio making circuit 770 which is described later.

Figure 9A:
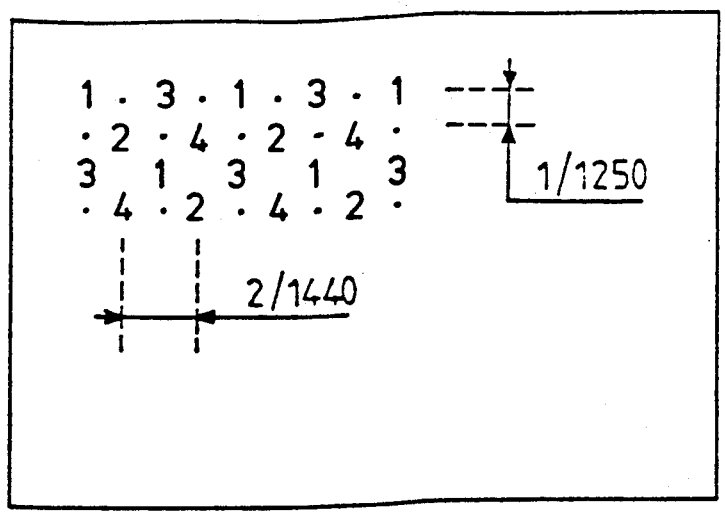
Figure 9B:
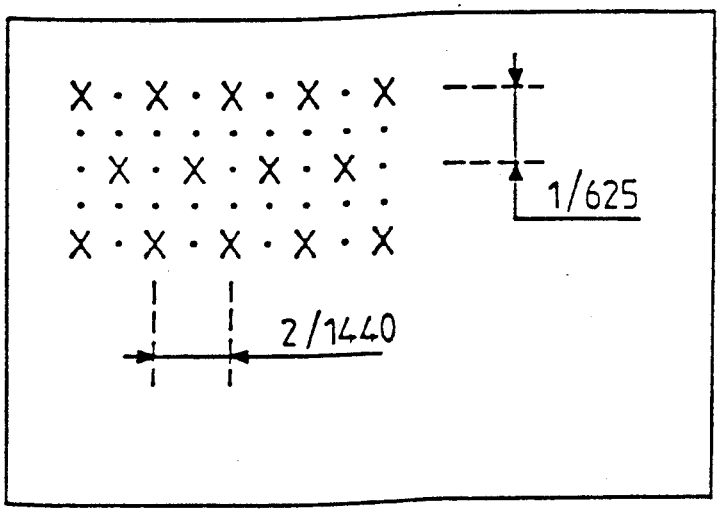

In the third branch 703, called the 80 millisecond branch, shown in FIG. 8a, the sequence of images E is firstly temporally filtered by a temporal filter 731 and it then passes through a spatial filter 732 in order to avoid the foldovers due to the spatial sub-sampling performed in the circuit 733 according to one of the four phases shown in FIG. 9a. The output of the spatial sub-sampling circuit 733 is then sent on the one hand to the decision making circuit 770 and on the other hand to a circuit 734 called a format modification circuit which, in four frames and in 80 milliseconds (therefore every 20 milliseconds), sends then in groups of lines (1, 5, 9, 13, etc..., then 2, 6, 10, 14, etc..., and so on over the 80 milliseconds, or in zig-zag configuration), to the routing circuit 740.

Figure 8C:
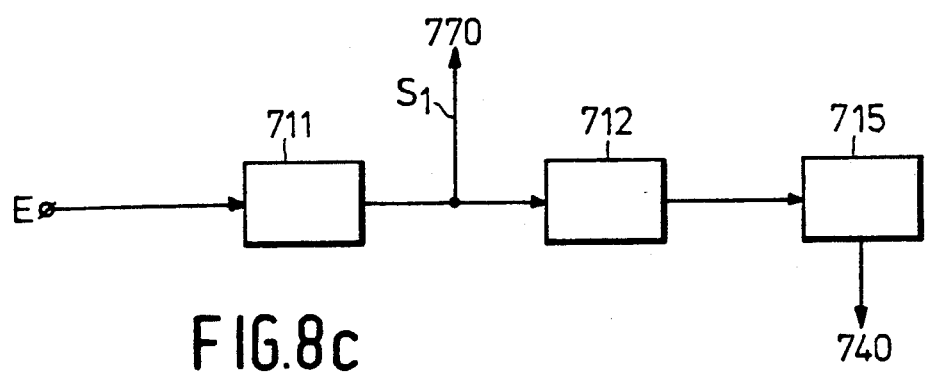
Figure 8D:
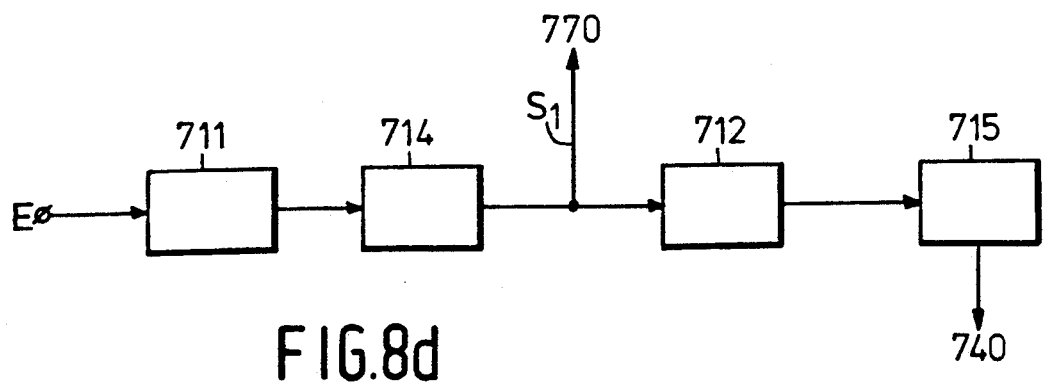
FIG. 8d shows a variant of the branch shown in FIG. 8c, and FIGS. 9a to 9c show the corresponding image formats at the output of the said branches.
Figure 9C:
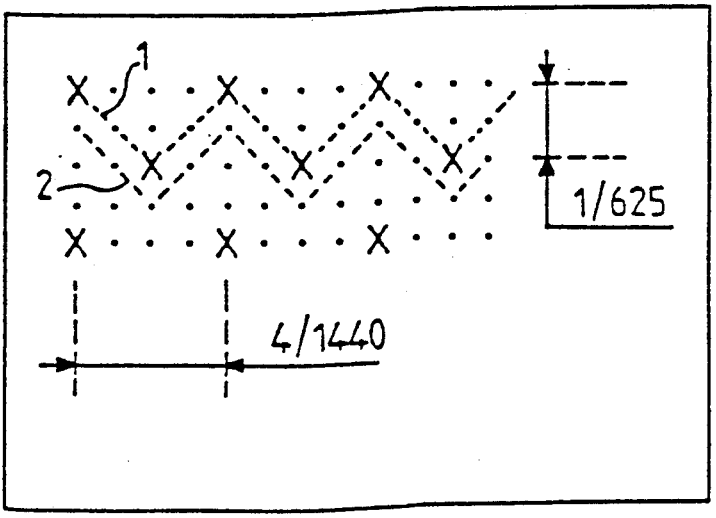

Finally, in the first branch 701 called the 20 millisecond branch, shown in FIG. 8c, the sampling structure is this time such that only one point in four is retained. The branch 701 comprises a spatial filter 711, followed by a vertical sub-sampler 714 having a rate of ½ in the case in which the input images are sequential, in order to return to the 1250 L., 50 Hz, 2:1, 1440 points/line format. In this case of sequential images, the embodiment of FIG. 8c is replaced by that of FIG. 8d. The branch 701 then comprises a quincuncial line spatial sub-sampler 712 having a ¼ rate which supplies 1250 L., 50 Hz, 2:1, 360 p./line images. These output images of the spatial sub-sampler 712, according to the image format shown in FIG. 9c, are supplied to a format modification circuit 715 which, in two fields and in 40 milliseconds (therefore every 20 milliseconds), sends to a third input of the routing circuit 740 for example firstly the samples in a zigzag configuration on the dotted line reference 1 and then those, also having a zigzag configuration but on a dotted line referenced 2 (see FIG. 9c). Only the pattern (in crosses) shown in FIG. 9c is of importance here. This pattern can be transposed from one frame to another. Thus the dotted line 2 can pass through any point adjacent to a cross, including through the crosses themselves. As before the input images of the sub-sampler 712 (connection $S_1$) are also sent to a third input of the decision making circuit 770.

From the above description, given with reference to FIGS. 7, 8a to 8c, and 9a to 9c, it results that the routing circuit 740 accepts on its three inputs, referenced 741 and 743 respectively, three sequences of images which are compressed images since, in each of the three branches 701 to 703, a certain number of image points has been eliminated. It will also be noted that, in each of the three sequences thus constituted, the images contain the same number of points or samples to be transmitted in each 20 millisecond time slot.

The routing circuit 740 therefore supplies on its output a sequence of points or samples in which the content corresponding to each original block of images comes from one or other of the three branches depending on the value of a decision signal received on an input 746 of this circuit 740 and combing from the decision making circuit 770.

This decision making circuit 770, described in the next paragraph, is preceded by a motion estimation circuit 760 similar to the motion estimation stage 204 in FIG. 2. This circuit 760 is itself preceded by a spatial filter 750 in order to change to a non-interlaced format, if this is not already the case, and in order to limit the passband. The object of the circuit 760, like the stage 204, is to determine, for each block (or group of m×n samples) of non-interlaced images of a certain rank (for example 2k+1 images of odd rank) which are eliminated before transmission, a displacement vector D. More precisely, this vector D must be such that it is possible to obtain an approximation of the eliminated image of rank 2k+1 from the half-sum of the non-eliminated images of rank 2k and 2k+2 which enclose it, the approximation error DFD associated with each block being minimum (it has been seen above that this research aimed at making the DFD error a minimum has already been described is prior documents, and that the example of it which was given was done so only as a preferred embodiment).

Figure 10:
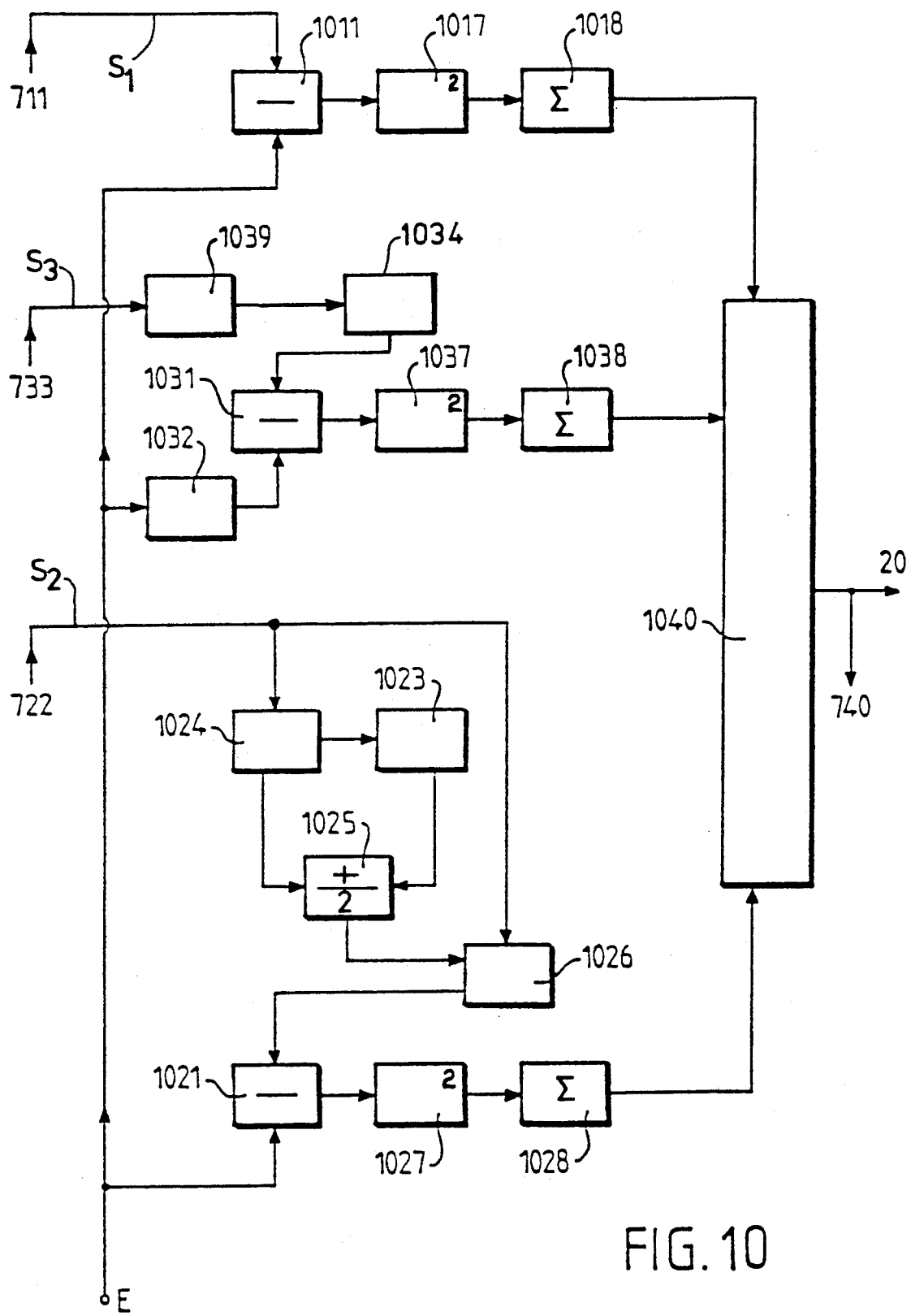
FIG. 10 shows the decision making circuit of the device shown in FIG. 7.

The decision making circuit 770 can now be described in detail. The circuit 770, shown in FIG. 10, comprises three parallel channels each comprising a comparison circuit, a squaring circuit and a block by block summing circuit, the outputs of these three channels being applied to three corresponding inputs of a circuit 1040 for comparing distortions and selecting the index of the branch corresponding to the smallest of them.

The first channel, corresponding to the 20 millisecond branch, firstly comprises a subtracter 1011, which receives on the one hand the input 1250 L., 50 Hz, 1440 p./line image and, on the other hand, the output $S_1$ of the filter 711 of the branch 701. This subtracter 1011 is followd by a squaring circuit 1017 and then by a summer 1018 over each block, whose output expresses the distortion relating to the 20 millisecond branch and is measured block by block.

The third channel, corresponding to the 80 millisecond branch, similarly comprises a subtracter 1031, which receives on the one hand, via a delay circuit 1032 intended to compensate for the delay introduced by the spatio-temporal filtering of the fixed branch 703, the input 1250 L., 50 Hz, 1440 p./line image and, on the other hand, via a storage circuit 1039 enabling the a storage of four successive sub-sampled frames coming from the output $S_3$ of the circuit 733 and a post-filtering circuit 1034 performing the interpolation of the 80 millisecond branch, the output $S_3$ of the filter 733. This subtracter 1031 is followed by a squaring circuit 1037 and by a block by block summer 1038 whose output expresses the distortion relating to the 80 millisecond branch.

The second channel, corresponding to the 40 millisecond branch, also comprises a subtracter 1021 receiving on one input the input 1250 L., 50 Hz, 1440 p./line image and, on its other input, the image obtained as follows from the output $S_2$ of the filter 722. This output $S_2$ is on the one hand sent to an input terminal of a switch 1026 and on the other hand to two memories in series 1023 and 1024 which store the successively transmitted images of rank 2k and 2k+2 respectively. These two memories 1023 and 1024 also receive the displacement vector D, determined for each block by the motion estimation circuit 760 in order to obtain an approximation of the eliminated image of rank 2k+1 from the half-sum of the images 2k and 2k+2. This half-sum is produced by an adder 1025 provided at the output of the two memories 1023 and 1024. The output of the adder 1025 is itself connected to the other input terminal of the switch 1026, whose output, alternately deriving from the output of the filter 722 or that of the adder 1025 for reconstructing an image in an interlaced format, is then supplied to the said other input of the subtracter 1021. This subtracter 1021 is followed, as in the two previous cases, by a squaring circuit 1027 and then by a block by a block adder 1028 whose output expresses the distortion relating to the 40 millisecond branch.

The distortions thus available at the output of the three parallel channels which have just been described are supplied, as mentioned above, to the circuit 1040 which compares them and selects the smallest of them in order to send the index of the correspondind branch to the input 746 of the routing circuit 740. This branch index constitutes the said decision signal which, in the routing circuit 740, commands the selection either of the output samples of the branch 701, or the output samples of the branch 702, or the output samples of the branch 703, with the restriction that, if the presence of an isolated decision is noted in the sequence of decisions, this decision is finally forced into being a decision identical to the closest eight decisions. The selection thus operated therefore commands the transmission of one of the three branch outputs.

Figure 11:
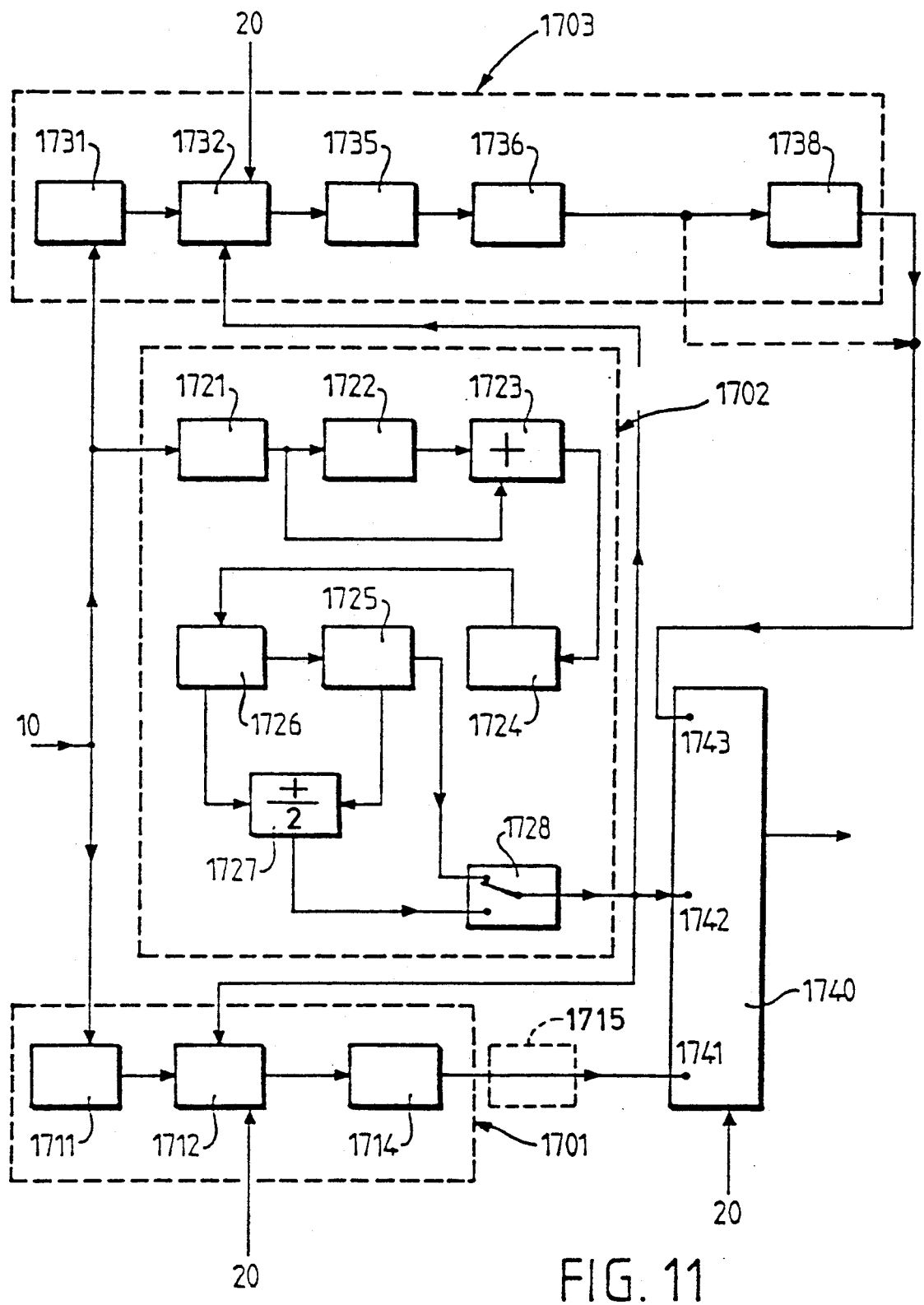
FIG. 11 shows an illustrative embodiment of a decoding device according to the invention, to be associated with an encoding device such as that shown in FIG. 7.

On reception, the images actually transmitted are, according to the invention, received and processed in the decoding device of FIG. 11 in order to reconstruct the original high resolution images. This decoding device firstly comprises, for this purpose, according to the invention, three parallel branches 1701, 1702, 1703 each of which receives the actually transmitted images end whose outputs are respectively received on the inputs 1741, 1742, 1743 of a routing circuit 1740. These branches 1701 to 1703 are also respectively called the 20, 40 and 80 millisecond branches.

In the branch 1702, known as the 40 ms branch, the sequence of transmitted images is supplied to a dyanmic interpolation circuit comprising a circuit 1721 for the insertion of zeroes between the transmitted signals, and to a circuit 1722, connected to the output of the latter and introducing a 20 millisecond delay. This circuit 1721 generates from two successive fields an image having the format shown in FIG. 9b, i.e. at a rate of 40 milliseconds in non-interlaced format. This dynamic interpolation circuit is followed by an adder 1723 adding the outputs of the circuits 1721 and 1722 respectively. The 1250 L., 25 Hz, 1:1 1440 p./line output image of the adder 1723 is supplied to a spatial post-filtering circuit 1724, and then to an image reconstruction circuit comprising two memories in series 1725 and 1726 and an adder 1727 producing the half-sum of the outputs of these meories, according to the method already described above in relation to the adder 444 of FIG. 4. The two memories 1725 and 1726 receive the displacement vector estimated on transmission and transmitted by the digital assistance channel 20. A switch 1728, which receives on the one hand the output of the memory 1725 and on the other hand that of the adder 1727, finally supplies a 1250 L., 50 Hz, 2:1, 1440 p./line image which is supplied to the input 1742 of the routing circuit 1740. In the case in which it is desired to display sequential images, the switch 1728 selects at one time the output of the memory 1725, and at another time that of the adder 1727, at the 50 Hz rate, in order to supply a 1250 line, 50 Hz, 1:1, 1440 points/line image.

In the branch 1703 called the 80 ms branch, the sequence of actually transmitted 625 L., 50 Hz, 2:1, 720 p./line images is first applied to a circuit 1731 called the dynamic interpolation circuit, intended to provide, as before, a reinsertion of zeroes between the signals actually transmitted for this 80 ms branch. This circuit 1731 generates from four successive fields an image having the format shown in FIG. 9a, i.e. a rate of 80 milliseconds in non-interlaced format. In the sequence of images thus obtained, the non-zero samples, in each image of the sequence, are located in quincuncial lines. These 1250 L., 50 Hz, 1:1, 1440 p./line output images of the circuit 1731 are then supplied to a multiplexer 1732 and then to a temporal filter 1735 and then to a spatial filter 1736 at the output of which a 1250 L., 50 Hz, 1:1, 1440 p./line image is available. Finally a circuit for conversion from non-interlaced format into interlaced format 1738 delivers a 1250 L., 50 Hz, 2:1, 1440 p./line image, which is applied to the input 1743 of the routing circuit 1740. In the case of a display of sequential images, the signal coming from the spatial filter 1736 is directly applied to the input 1743 of the circuit 1740 (connected on dotted line).

The branch 1701, called the 20 ms branch, simply comprises a dynamic interpolation circuit 1711, for the insertion of zeros as before. This circuit 1711 generates from an input field an output field according to the format shown in FIG. 9c, a field at the 20 i.e. millisecond rate or an image with a 40 millisecond rate in interlaced format. The branch 1701 then comprises amultiplexer 7112 and a spatial post-filtering circuit 1714 which supplies a 1250 L., 50 Hz, 2:1, 1440 p./line image which is then applied to the input 1741 of the routing circuit 1740. In the case of a display of sequential images, the signal coming from the spatial post-filtering circuit 1714 is converted into non-interlaced format by a format conversion circuit 1715 (shown in dotted line) supplying a 1250 line, 50 Hz, 1:1, 1440 points/line image.

The output of the decision making circuit 770, which was sent on transmission to the routing circuit 740, is also sent to the digital assistance channel 20, for the purpose of reconstucting this information on decoding. The routing circuit 1740, and the multiplexers 1712 and 1732, receive the said output information of the circuit 770 transmitted by the channel 20. The circuit 1740 uses this decision signal form correspondingly selecting the appropriate output from the branches 1703, 1702, 1701: the multiplexers 1712 and 1732 either simply supply the output signal of the circuit 1711 or 1731 respectively if the decision signal correctly corresponds to the branch concerned (the 20 ms branch 1701 or the 80 ms branch 1703 respectively), or supply, in the opposite case, the output of the switch 1728 of the 40 ms branch 1702, re-establishing, depending on the case, the format shown in FIG. 9a (the case of the multiplexer 1732) or that of FIG. 9c (the case of the multiplexer 1712). The high resolution reconstructed (1250 L., 50 Hz, 2:1, 1440 p./line or 1250 L., 50 Hz, 1:1, 1440 p./line) image is therefore finally available at the output of the routing circuit 1740.

Figure 12:
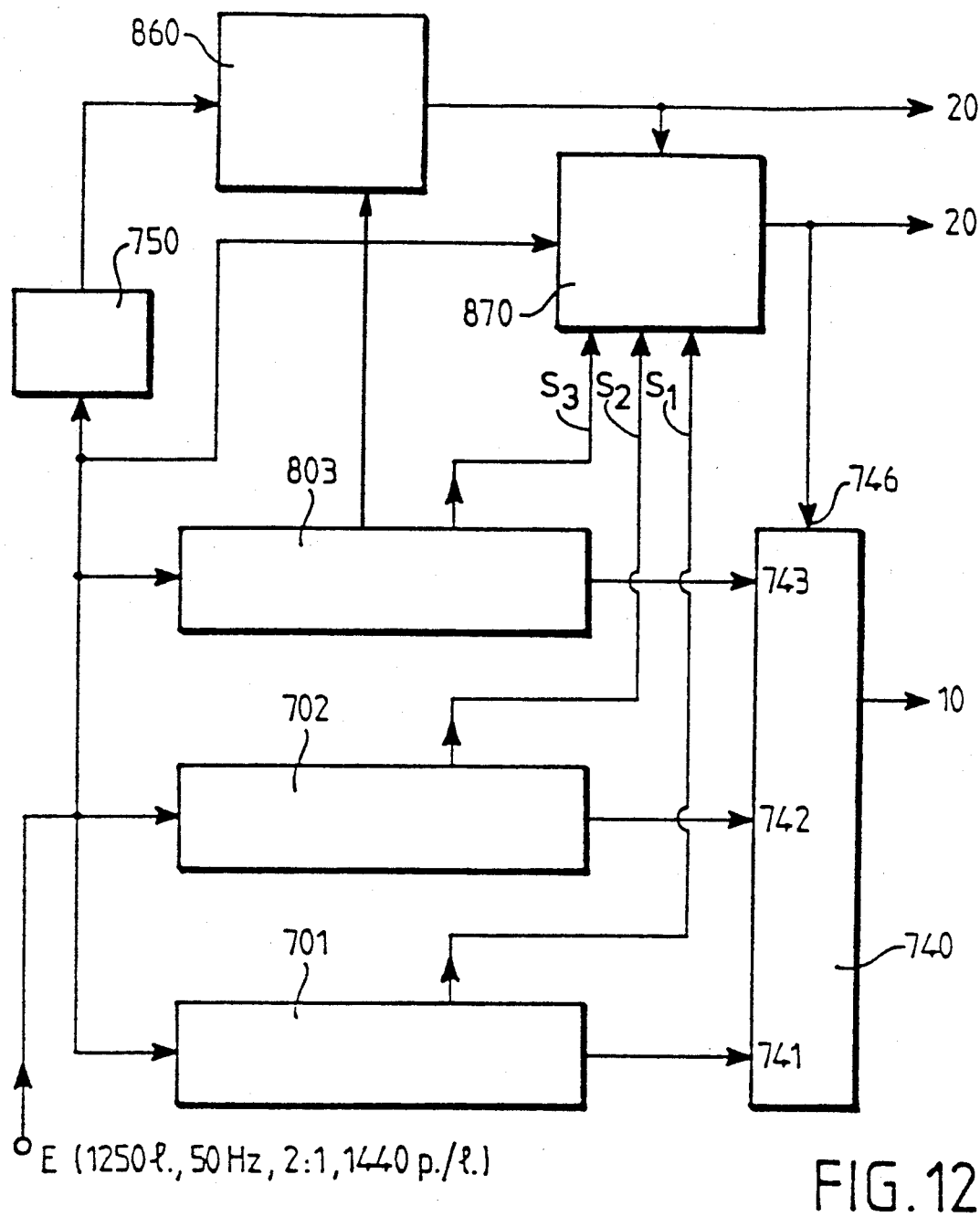
FIG. 12 shows a perfected variant embodiment of the encoding device shown in FIG. 7.

FIG. 12 shows another embodiment of the encoding device, and FIG. 17 correspondingly shows the decoding device associated with this encoding device in the transmission system.

Figure 13:
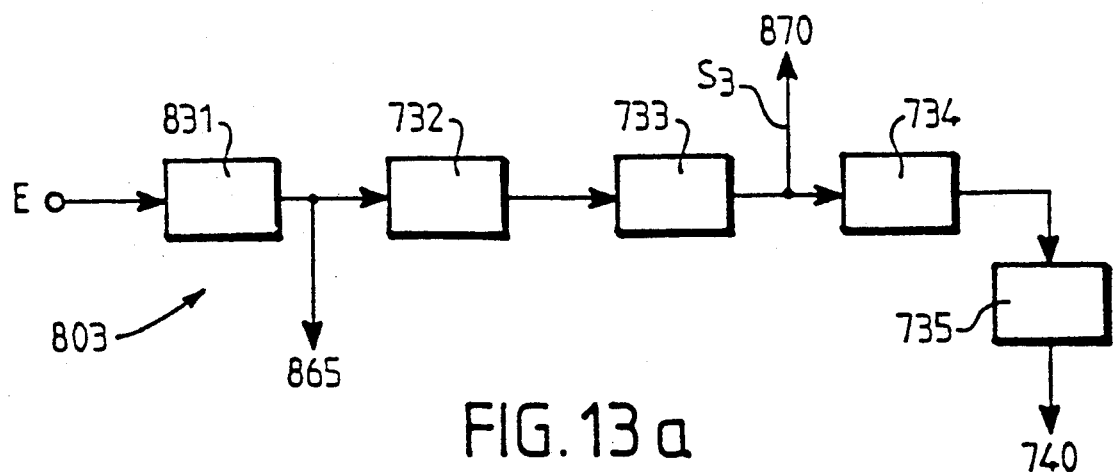
FIGS. 13a to 13c are a detailed representation of the three processing branches of the device shown in FIG. 12.
Figure 13:
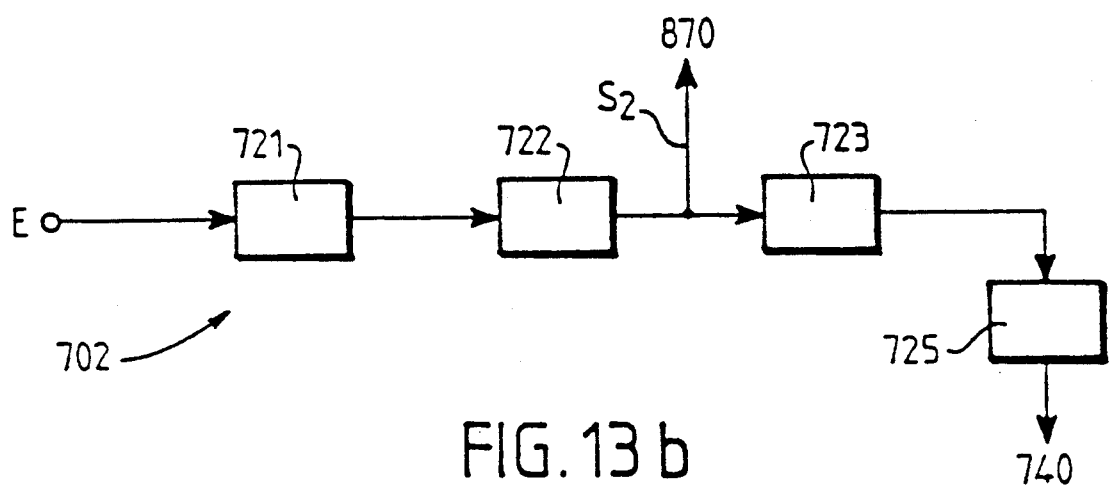
Figure 13:
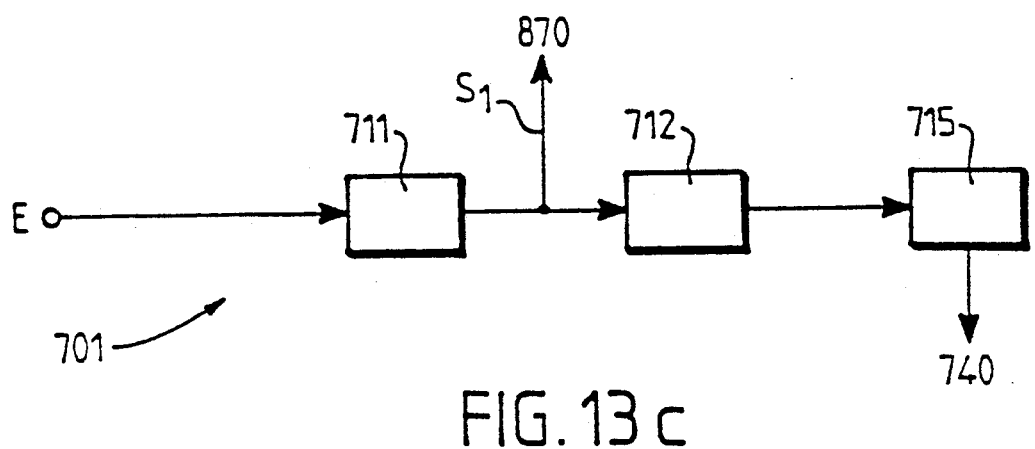

The encoding device of FIG. 12 comprises, in parallel, as in the case of FIG. 7, three processing branches (20, 40 and 80 ms) each receiving on their common input E, a sequence of interlaced 1250 L., 50 Hz, 2:1, 1440 p./line images, which are constituted as shown in FIGS. 13a to 13c.

Figure 14:
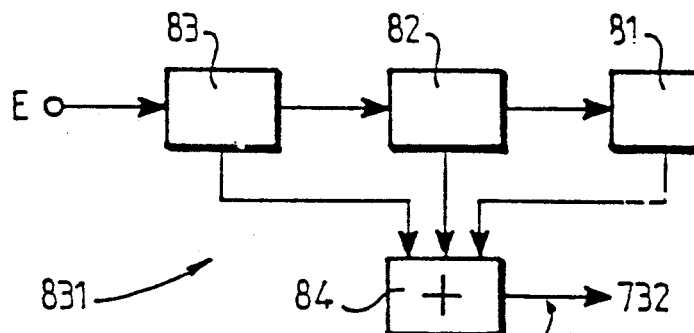
FIG. 14 shows the temporal filter of the third of these processing branches.

The first two branches are identical to the branches 701 and 702 of FIG. 7, i.e. they respectively comprise the same elements 711, 712, 715 and 721, 722, 723, 725 as the latter, such as have been shown in a detailed way in FIGS. 8c and 8b. The third branch, 803, differs from the branch 703 in that it comprises, instead of a simple temporal filter 731, a temporal filter 831 which is motion compensated and operates over a 40 millisecond range and comprises for this purpose, as seen in FIG. 14 which shows this temporal filter, three image memories 81, 82, and 83 and an adder 84. This temporal filter 831 supplies 1250 L., 50 Hz, 1:1, 1440 p./line images and is then followed by the same circuits as those found in the branch 703, namely the ¼ rate temporal sampler 832, which supplies 1250 L., 12.5 Hz, 1:1, 1440 p./line images, the spatial filter 833, which enables the bandwidth of the signal to be limited and the spectrum foldover due to the sub-sampling performed to be avoided, and the ½ rate line quincuncial spatial sub-sampler 834, which supplies 1250 L., 12.5 Hz, 1:1, 720 p./line images according to the image format shown in FIG. 9a. The output images of the sub-sampler 834 are, as in the branch 703, supplied to a format modification circuit 734 identical to the circuit 735 which itself sends them to the routing circuit 740.

As before, the routing circuit 740 supplies at its output a sequence of points or samples in which the content corresponding to each block of the original images comes, via one of the inputs 741 to 743, from one or other of the three branches 701, 702, 803 depending on the value of the decision signal received on the input 746. This decision signal comes from a decision circuit 870 which is itself preceded by an estimation stage consisting of a motion estimation circuit 860.

Figure 15:
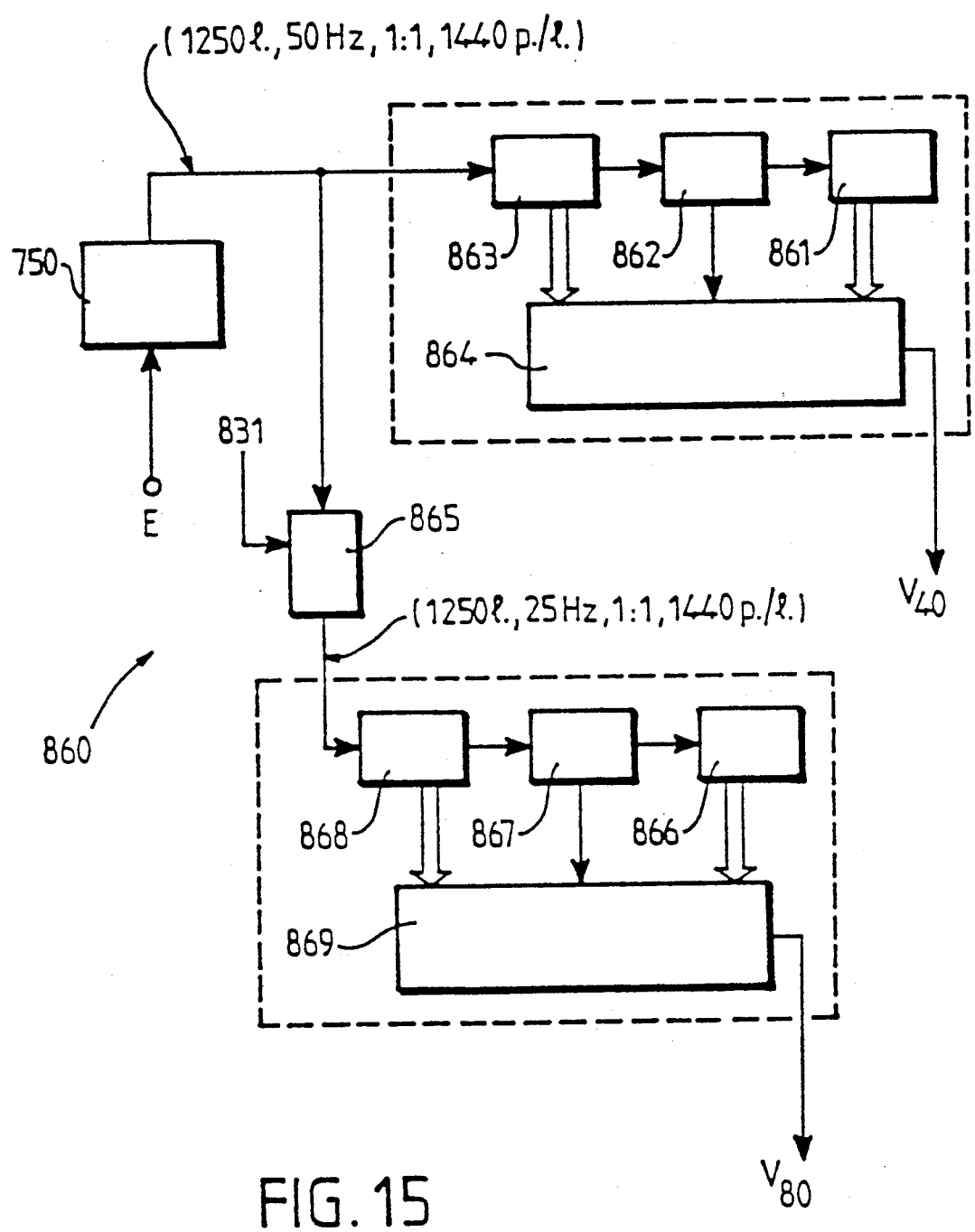
FIGS. 15 and 16 are a more detailed representation of the motion estimation circuit and the decision circuit of the encoding device of FIG. 12.

This circuit 860, shown in FIG. 15, comprises on the one hand a first group of circuits identical to the motion estimation circuit 760 and therefore composes of three image momories 861, 862, 863 and a motion estimation device 864. In parallel with this first group 861 to 864, there is provided a temporal sub-sampling circuit 865 intended to divide the temporal rate of the series of sequential images supplied to the said first group by two. This circuit 865, which also receives the output of the motion compensated temporal filter 831, is followed by a second group also comprising three image memories 866, 867 868 and a motion estimation device 869.

The motion estimation circuit 860, which is itself preceded (see FIG. 12) by a spatial filter 750 for conversion from interlaced format into non-interlaced format, is intended to no longer supply a series of displacement vectors but two groups of such displacement vectors, referenced $V_{40}$ and $V_{80}$ in accordance with the respective temporal rate of the corresponding series of images.

Figure 16:
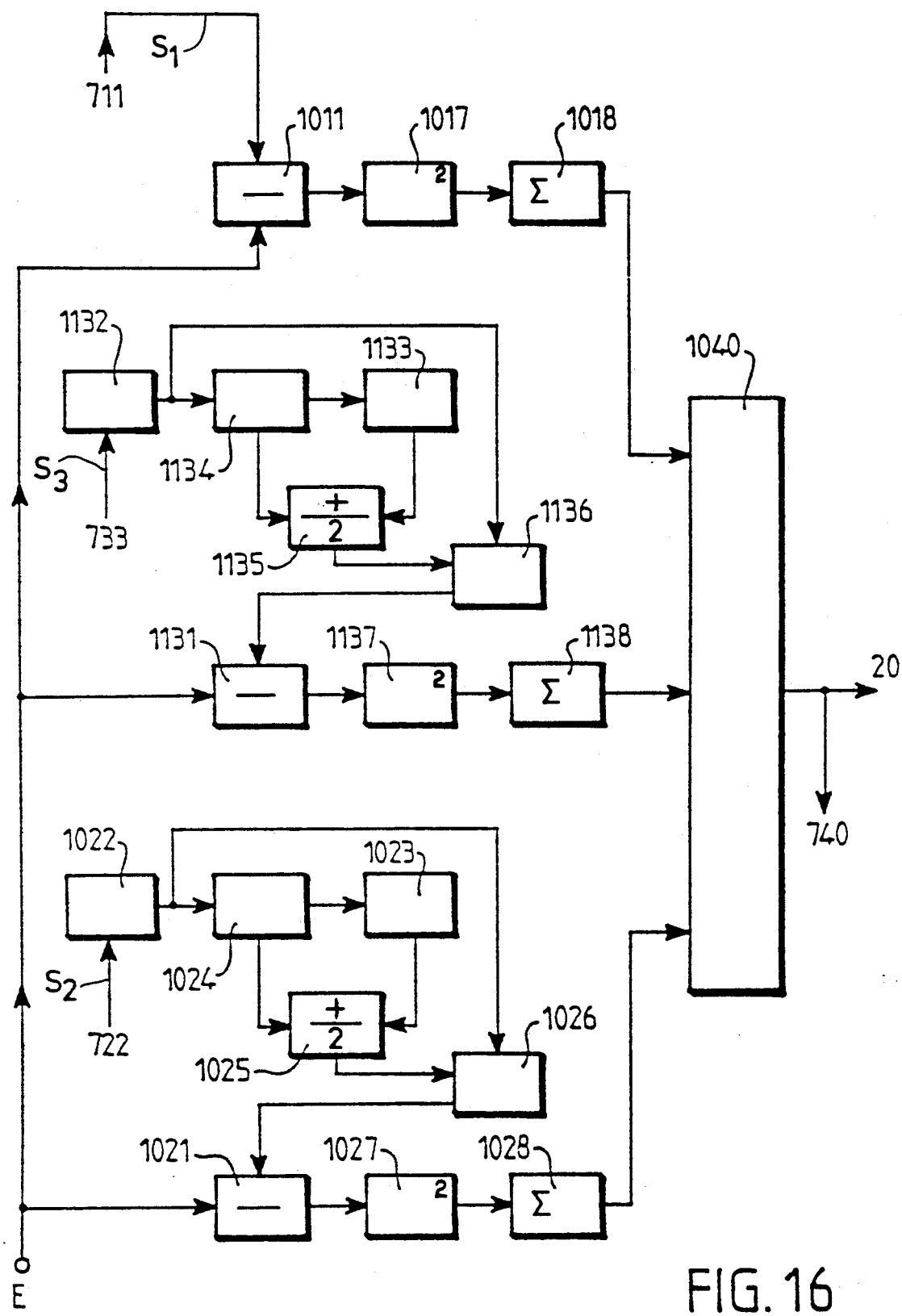

The decision circuit 870 is also of the same type as the circuit 770, with the sole difference that the signal $S_3$ (see FIG. 8a) received by the circuit 870 here undergoes a motion compensated filtering. As shown in FIG. 16, the circuit 870 therefore comprises three parallel channels but two of them, the second and third channels, are identical to what they were in the circuit 770 and comprise the same elements 1011, 1017, 1018 and 1021 to 1028. The third channel is modified in the sense that it now com-comprises, like the second channel of the decision circuit 770 in FIG. 10, elements 1131 to 1138 absolutely identical to the elements 1021 to 1028 of this FIG. 10 and having the same purpose.

In the opposite direction, on reception, the images actually transmitted after encoding in the device of FIG. 12 will be processed in the decoding device of FIG. 17 for the purpose of reconstructing the original high definition images. This decoding device firstly comprises, as in the case of FIG. 7 on transmission, and of FIG. 11 on reception, three parallel branches 1701, 1802, 1803, called the 20, 40 and 80 ms branches, receiving the transmitted images and whose outputs are received on the inputs 1741 to 1743 of the routing circuit 1740.

The first branch 1701 is identical to what it was in the embodiment of FIG. 11. The second branch 1820 is practically identical to the branch 1702 of FIG. 11 with the sole difference that the interpolation circuit is modified and now also comprises a multiplexer 1729, provided in series between the adder 1723 and the spatial post-filtering circuit 1724. This modified dynamic interpolation circuit is intended to generate a regular link by sampling either the data transmitted on two successive fields for the blocks processed in 40 ms and 20 ms, or the data coming from the 80 ms branch.

The third branch 1803 firstly comprises a dynamic interpolation circuit 1831, which, from four successive fields of the sequence of transmitted images, reconstructs an image having a 1250 L., 12.5 Hz, 1:1, 1440 p./line format, then a spatial filter 1832 at the output of which is available a 1250 L., 12.5 Hz, 1:1, 1440 p./line image. This image is then supplied to an image reconstuction circuit comprising two memories in series 1833 and 1834, receiving the displacement vector $V_{80}$ estimated on transmission and transmitted by the digital assistance channel 20, an adder 1835 producing the half-sum of the output of these memories, and a switch 1836 which receives on the one hand the output of the memory 1833 and on the other hand that of the adder 1835 and supplies a 1250 L., 25 Hz, 1:1, 1440 p./line image. This image is transmitted on the one hand to the multiplexer 1837, which also receives the output of the spatial post-filtering circuit 1724, and on the other hand to the multiplexer 1729 of the dynamic interpolation circuit of the second branch 1802. The multiplexer 1837 is itself followed by another image reconstruction circuit comprising, like the previous one, two image memories, 1838 and 1839, and adder 1840 producing the half-sum of these memories, and a switch 1841 which receives on the one hand the output of the memory 1838 and on the other hand that of the adder 1840 and supplies a 1250 L., 50 Hz, 2:1, 1440 p./line mage. The two memories 1838 and 1839 this time receive only the half-displacement vector $V_{80}/2$, since the interpolation interval is 40 ms, i.e. half amplitude, and the output of the switch 1841 is applied to the input 1743 of the routing circuit 1740.

This routing circuit 1740 receives not only the outputs of the three branches 1701, 1802, 1803, but also, on its input 1746, the output of the decision making circuit 870 obtained on transmission and sent, like the estimated displacement vectors, to the digital assistance channel 20 for the purpose of restoring this information on decoding. This output of the decision making circuit 870 is also applied to the multiplexer 1837, and to the dynamic interpolation circuits of the 20 ms branch 1701 and the 40 ms branch 1802. The routing circuit 1740 uses the decision signal as before for selecting in a corresponding manner the appropriate output from the outputs of branches 1701, 1802 and 1803.

After the description of the various encoding and decoding devices which have just been given in detail, it will finally be stated that it is possible to provide, in a corresponding way on transmission and on reception, in each of the first, second and third processing branches, a switch enabling the switching out of circuit of the processing branch in which it is placed. Thus, an encoding device according to the invention can be constituted, as described by the three branches mentioned, or can be constituted by only two of them, the first and the third, or the first and the second, or the second and the third, or can be constituted by just one of the three of them. The structure of the decoding device is of course directly linked in this respect with that of the encoding device, and the openings and closings of the respective switches of the corresponding branches on the encoding and on the decoding sides will be controlled in a strictly similar manner. The various variant embodiments which result from this are not described in greater detail as they do not raise any particular problems of embodiment.

Another embodiment of the encoding device according to the invention can be described in the case in which the temporal sub-sampling rate is equal to 2. It has in fact been seen, in the preceding description, that the objective of the proposed principle and implementations was to transform a series of high definition images into compressed images, the compression of the video passband thus carried out being intended to enable compatibility with the current 625 line, interlaced, 50 Hz television standard having passband of about 6 MHz.

It is however noted that the series of compressed images, called compatible images, can be affected by faults manifesting in the form of jerks (due to the 25 Hz image frequency) in image regions processed by a 40 millisecond branch. The additional proposed temporal filtering enables the elimination or at least the reduction of this fault, while efficiently providing restoration or the motion between successive compatible images.

Figure 18A:
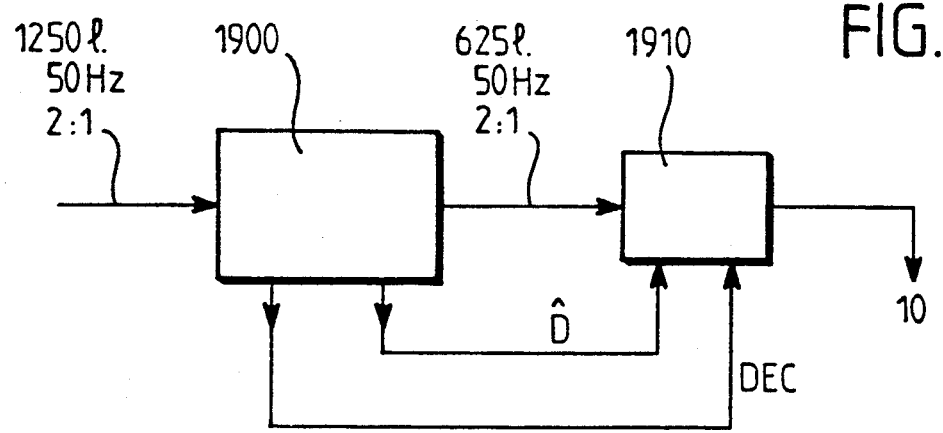
FIGS. 18a and 18b show a variant embodiment of the encoding device, with motion compensated temporal filtering, and the corresponding decoding device.
Figure 18B:
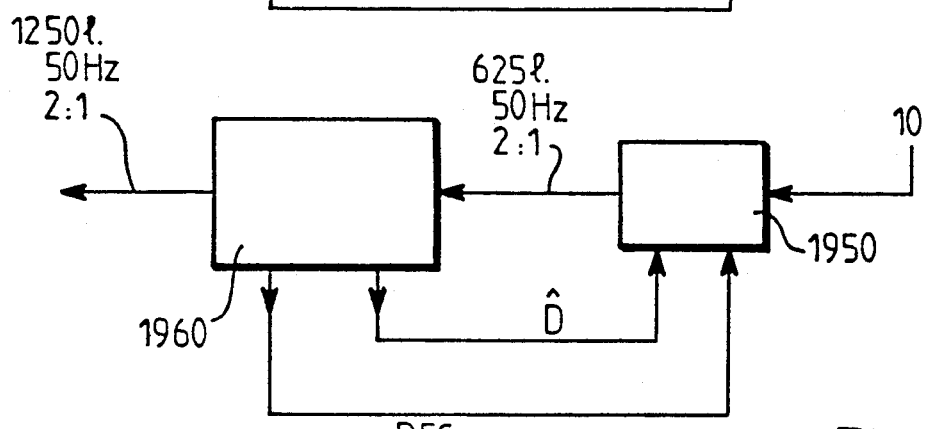
Figure 21:
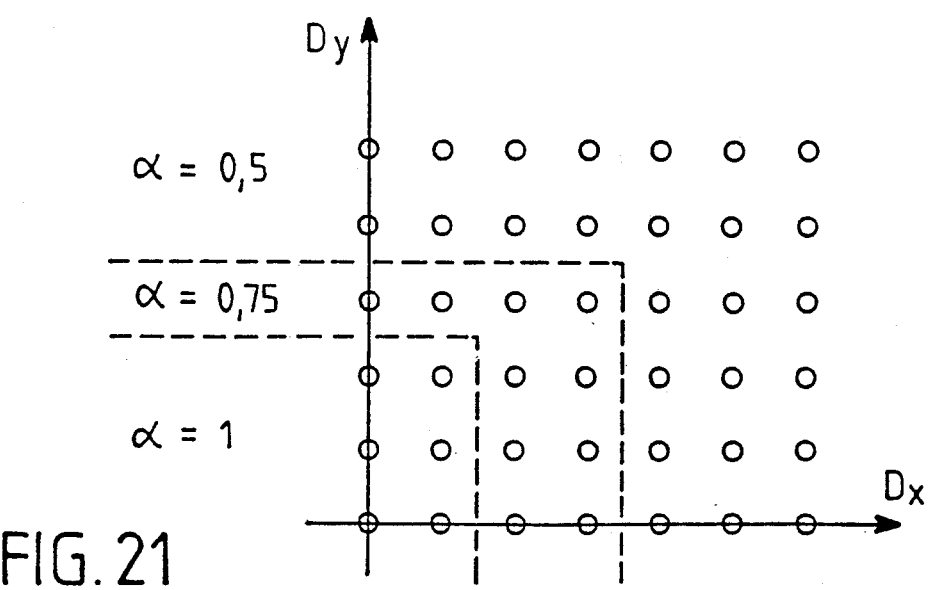
FIG. 21 shows examples of values of the weighing coefficients depending on the amount of motion in the images.

FIG. 18a shows the embodiment of this temporal filtering in the encoding device, and FIG. 18b correspondingly shows the implementation of the inverse filtering in the associated decoding device. In FIG. 18a, the reference 1900 is an overall reference to the encoding circuit such as previously described in the one or other proposed embodiments. This encoding circuit 1900 therefore receives the high resolution 1250 L., 50 Hz, 2:1, 1440 p./line images and supplies the 625 L., 50 Hz, 2:1 720 p./line so-called comparatibe compressed images. The sequence of the compressed images is then supplied to a temporal filtering circuit 1910, which also receives from the device 1900 the displacement vector D selected by the motion estimation circuit and the decision signal, reference DEC, provided by the decision making circuit, (these values D and DEC are also supplied, it may be recalled, to the digital assistance channel 20 in order to be used again on reception in the decoding device). The output of the temporal filtering circuit 1910 is sent to the analog transmission channel 10.

On reception, as shown in FIG. 18b, the signals coming from this channel 10 are received by an inverse temporal filtering circuit 1950, and the sequence of compressed images present at the output of this circuit is reconverted by the decoding circuit 1960 (in one of the described decoding circuit embodiments) into a series of high definition images ready to be displayed. The decoding circuit 1960 also returns the displacement vector D and the decision signal DEC to the inverse temporal filtering circuit 1950.

Figure 19:
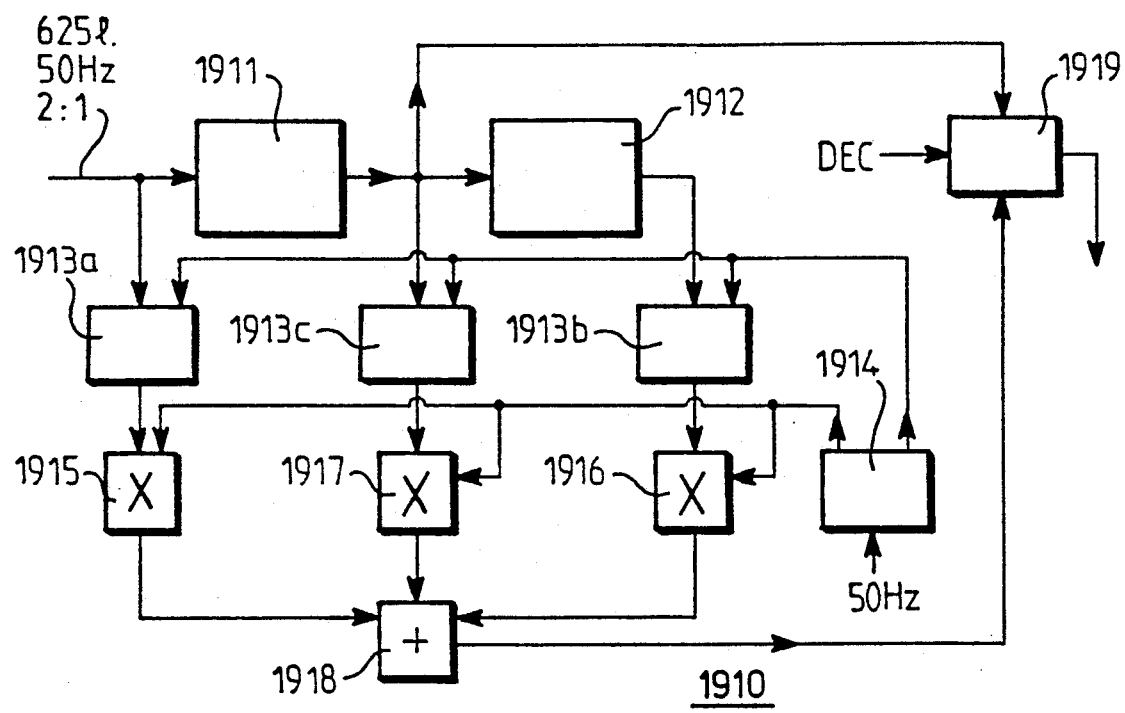
FIGS. 19 and 20 are a more detailed representation of the motion compensated temporal filtering circuit used in the encoding device, and the inverse temporal filtering circuit used in the associated decoding device.

FIG. 19 is a more detailed representation of a preferred embodiment of the temporal filtering circuit 1910, which comprises in the described example two delay circuits (or field memories) 1911 and 1912 in series, three displacement correction circuits 1913a, 1913b, and 1913c, respectively connected to the input of the first delay circuit 1911, to the output of the second delay circuit 1912 and to the common point of these two delay circuits, a read only memory 1914 controlled by the image frequency (50 Hz), three multipliers, 1915, 1916 and 1917, are respectively connected to the output of the first, second and third displacement correction circuits 1913a, 1913b and 1913c, an adder 1918 adding the three respective outputs of the three multipliers 1915 to 1917, and a multiplexer 1919.

The principle of this circuit 1910 consists in carrying out, in the image zones processed by the 40 ms branch, a weighted sum of the successive images in the direction of the motion. This filtering is carried out over three successive frames, and the delays imparted by the delay circuits 1911 and 1912 are then 20 milliseconds. The weighting factors applied to the multipliers, $\alpha$ for the multiplier 1917 and $(1-\alpha)/2$ for the multipliers 1915 and 1916, are functions of the estimated displacement vector D, as will be explained below.

The displacement correction circuits 1913a, 1913b and 1913c are delay circuits whose delays are also, for two of them related to the vector D. The displacement correction circuit 1913c in fact introduces a delay $T_o$ which is equal to the sum of the two maximum delays or shifts which can be observed horizontally and vertically between two successive images in the sequence of compressed images, taking account of the class of motion of the said images. The displacement correction circuits 1913a and 1913b therefore introduce respective delays of $T_o+dT$ and $T_o-dT$, where dT represents the sum of the two actually observed delays or shifts, taking account of the actually observed motion and therefore of the estimated displacement vector D (the value 2dT is the delay or shift corresponding to the said estimated vector D having components $D_x$, $D_y$).

The multiplexer 1919 receives on the one hand the output of the adder 1918, the compressed image available at the output of the delay circuit 1911 on the other hand, and also the decision signal DEC. When this signal DEC indicates that an image block is processed by the 40 ms branch, the multiplexer 1919 selects the output of the adder 1918, i.e. the temporally filtered compressed image, otherwise it selects the output of the circuit 1911. Furthermore in this case in which the multiplexer 1919 selects the filtered image, $\alpha$ is alternately a function of the displacement vector D as mnentioned above, or, on the other hand, equal to 1, depending on the parity of the frames (for example equal to 1 for the odd frames and a function of D for the even frames). The memory 1914 is intended to supply the circuits 1913a, 1913b and 1913c with the appropriate values of the components $D_x$ and $D_y$ of the displacement vectors D and the multipliers 1915 to 1917 with the appropriate values of $\alpha$.

Figure 20:
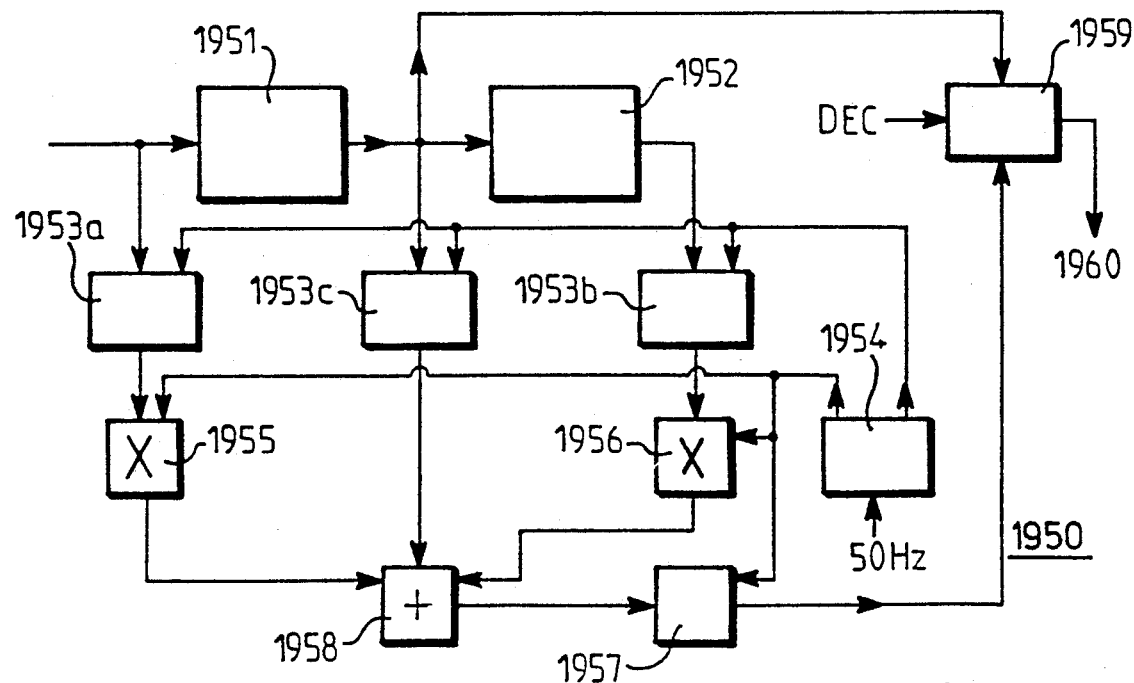

On reception, the filtering performed by the inverse temporal filtering circuit 1950 is very similar to that of the circuit 1910: FIG. 20 shows a preferred embodiment of the circuit 1950, which in fact comprises two delay circuits 1951 and 1952, applying a delay of 20 milliseconds each, three displacement correction circuits 1953a, 1953b and 1953c respectively connected to the input of the first delay circuit 1951, to the output of the second delay circuit 1952 and to the common point of these two delay circuits, two multipliers 1955 and 1956 multiplying by $(1-\alpha)/2$ (the appropriate values of $\alpha$ supplied by memory 1954), connected to the output of the displacement correction circuits 1953a and 1953b respectively, an adder 1958 adding the output of the third displacement correction circuit 1953c and the two outputs of the two multipliers 1955 and 1956 respectively, a multiplier 1957 multiplying the output of the adder by $1/\alpha$ (the appropriate values of $\alpha$ supplied by memory 1954), and a multiplexer 1959 receiving on the one hand, on a first input, the output of the multipliers 1957 and, on the other hand, on a second input, the compressed image, taken from the output of the first delay circuit 1951.

As before, this multiplexer selects one of its two input signals depending on the value assUmed by the decision signal DEC which it receives on a third input, and sends the signal thus selected to the decoding circuit 1960, the value of $\alpha$ furthermore being, as in the case of direct filtering, equal to 1 or a function of the estimated displacment vector, depending on the parity of the frames.

In both transmission and in reception, the temporal filtering thus performed could degrade the performance of the system with repect to noise if the value of the weighting factor $\alpha$ were not carefully chosen. In fact, the advantage of a low value of $\alpha$ is to reduce the jerks and to improve the quality of the compatible images, but the degradation mentioned becomes more pronounced as $\alpha$ becomes smaller. The compromise adopted consists in fact in choosing a value for the factor which is a function of the displacement vector. The smaller the displacement vector, the closer $\alpha$ becomes to 1 (weak filtering), and, in the other direction, the larger the motion becomes, the lower becomes and the filtering becomes more intense and the jerks are eliminated. FIG. 2 shows a few discrete examples of values which the factor can assume depending on the values which the components $D_x$ and $D_y$ of the estimated displacement vector themselves assume in the plane of the images, for example $\alpha=1$, $\alpha=0.75$, $\alpha=0.5$, etc. . . . , for velocity components expressed in image points per second.

Figure 22:
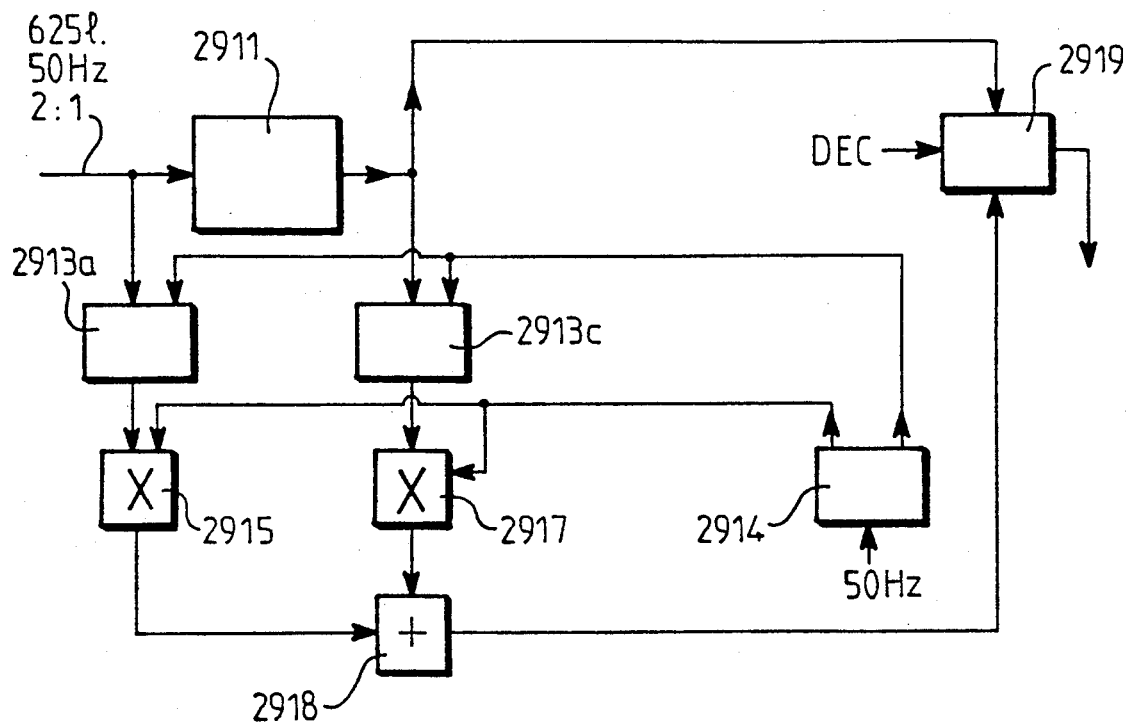
FIGS. 22 and 23 show variants of the direct and inverse temporal filtering circuits of the encoding and decoding devices shown in FIGS. 18a and 18b.
Figure 23:
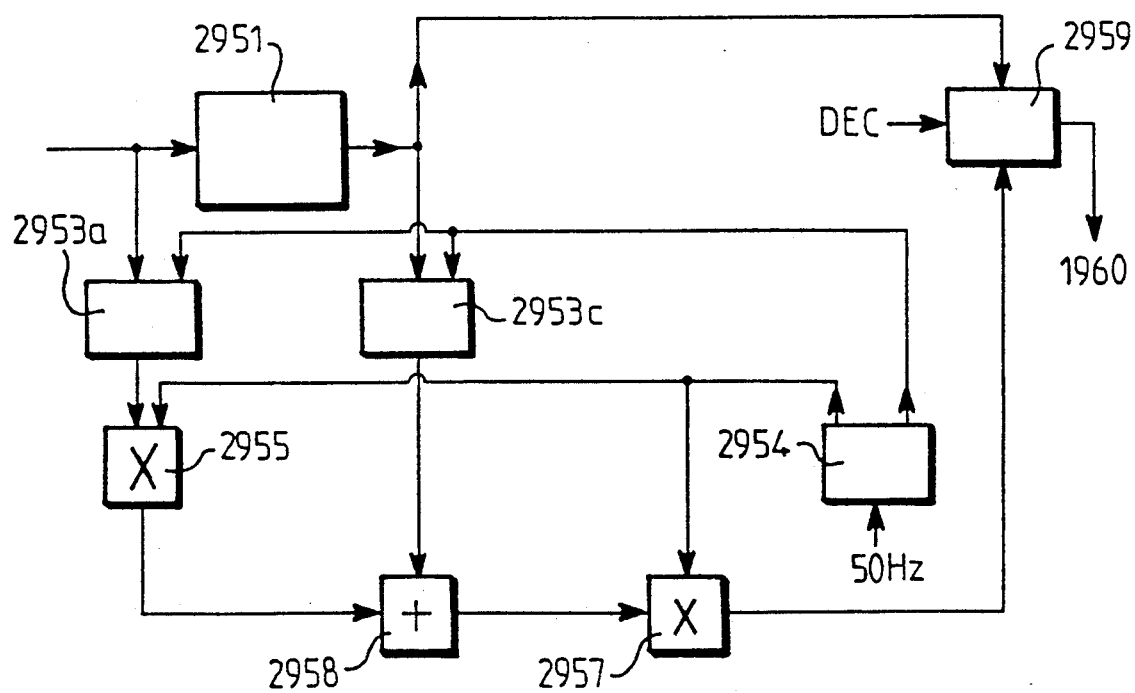

Furthermore, it is of course possible to propose variants. In particular, the structure of the temporal filtering circuit 1910 can be modified, for example by dispensing with one of its parallel channels, as shown in FIG. 22. The elements 1911 to 1919 of FIG. 19 are now replaced by the identical elements 2911 to 2919, with the exception of the elements 1912, 1913b and 1916 which are dispensed with. Furthermore, the weighting factor applied to the multiplier 2915 is here equal to $1-\alpha$ instead of $(1-\alpha)/2$ for the multiplier 1915. The inverse temporal filtering circuit in FIG. 23, corresponding to the direct filtering circuit in FIG. 22, has similar modifications with respect to FIG. 20, namely in that the elements 1951 to 1959 are replaced by identical elements 2951 to 2959 with the exception of the elements 1952, 1953b and 1956 which are dispensed with and of the multiplier 1955 which becomes a multiplier 2955 receiving the weighting factor $1-\alpha$ instead of $(1-\alpha)/2$. Furthermore, the delays imparted by the displacement correction circuits 2913a and 2953a are now equal to $T_O+dT$,. and those of the circuits 2913c and 2953c are equal to $T_O-dT$.

APPENDIX $$I(X, 2k + 1) = \frac{I(X - D, 2k) + I(X + D, 2k + 2)}{2} \quad (1)$$

$$\sum_{\text{blocks}} [I(X, 2k + 1) - I(X, 2k + 1)]^2 \quad (2)$$

$$\sum_{\text{blocks}} [DFD (X,D_x)]^2 \quad (3)$$

$$I = \frac{I(X - D_{min2}, 2k) + I(X + D_{min2}, 2k + 2)}{2} \quad (4)$$

We claim:

1. A decoder for use in a high definition television system wherein a plurality of images are encoded and transmitted as image data by means of a first channel having a limited passband and at a transmission rate selected from three separate transmission rates, said selected transmission rate being determined by a decision signal from a decision circuit, and wherein motion data representative of motion in said original images is derived and transmitted together with said decision signal by means of a second channel, said decoder comprising:

a) a plurality of processing branches coupled in parallel and each receiving said image data from said first channel and providing respective processed data outputs, each of said branches comprising in series, a dynamic interpolation circuit and a spatial filtering circuit, a first said processing branch further comprising means coupled to said second channel, for reconstructing said images from said image data or said motion data, and second and third processing branches each further comprising a multiplexer having a first input coupled to the dynamic interpolation circuit of its respective branch, a second input coupled to said second channel and a third input coupled to said reconstructing means; and b) selection means having a first input coupled to said second channel and a plurality of data inputs each coupled respectively to said processed data outputs, for selecting as a selected output one of said processed data outputs in response to said decision signal.

2. The decoder of claim 1, wherein said first processing branch further comprises in series, a delay circuit having an input coupled to output of the dynamic interpolation circuit of its respective branch, an adder circuit coupled to the output of said respective delay circuit and the output of said respective dynamic interpolation circuit, and wherein said third branch further comprises a temporal filter coupled to its respective multiplexer.

3. The decoder of claim 1, wherein said reconstructing means comprises first and second memories coupled in series and each having first and second outputs, a second adder circuit having a sum output and first and second inputs coupled to respsective first outputs of said first and second memories, and a switch having a first input coupled to said second output of said second memory, a second input coupled to said sum output and a switch output.

4. The decoder of claim 1, wherein said reconstructing means comprises first and second memories coupled in series and each having first and second outputs, a second adder circuit having a sum output and first and second inputs coupled to respective first outputs of said first and second memories, and a switch having a first input coupled to said second output of said second memory, a second input coupled to said sum output and a switch output.

5. A high definition television system comprising an encoder wherein a plurality of images are encoded and transmitted as image data by means of a first channel having a limited passband and at a transmission rate selected from three separate transmission rates, said selected transmission rate being determined by a decision signal from a decision circuit, and wherein motion data representative of motion in said original images is derived and transmitted together with said decision signal by means of a second channel, and a receiver comprising a decoder as claimed in claim 1.

6. A high definition television system comprising an encoder wherein a plurality of images are encoded and transmitted as image data by means of a first channel having a limited passband and at a transmission rate selected from three separate transmission rates, said selected transmission rate being determined by a decision signal from a decision circuit, and wherein motion data representative of motion in said original images is derived and transmitted together with said decision signal by means of a second channel, and a receiver comprising a decoder as claimed in claim 1.

7. A high definition television system comprising an encoder wherein a plurality of images are encoded and transmitted as image data by means of a first channel having a limited passband and at a transmission rate selected from three separate transmission rates, said selected transmission rate being determined by a decision signal from a decision circuit, and wherein motion data representative of motion in said original images is derived and transmitted together with said decision signal by means of a second channel, and a receiver comprising a decoder as claimed in claim 3.

8. A high definition television system comprising an encoder wherein a plurality of images are encoded and transmitted as image data by means of a first channel having a limited passband and at a transmission rate selected from three separate transmission rates, said selected transmission rate being determined by a decision signal from a decision circuit, and wherein motion data representative of motion in said original images is derived and transmitted together with said decision signal by means of a second channel, and a receiver comprising a decoder as claimed in claim 4.

* * * * *